(12) United States Patent
Temple et al.

(10) Patent No.: US 12,036,509 B2
(45) Date of Patent: Jul. 16, 2024

(54) METHODS AND EQUIPMENT FOR TREATMENT OF ODOROUS GAS STREAMS

(71) Applicants: Stephen R. Temple, Santa Cruz, CA (US); Howard Everett Whitney, Shrewsbury, MA (US); Bjorn Temple, Santa Cruz, CA (US)

(72) Inventors: Stephen R. Temple, Santa Cruz, CA (US); Howard Everett Whitney, Shrewsbury, MA (US); Bjorn Temple, Santa Cruz, CA (US)

( * ) Notice: Subject to any disclaimer, the term of this patent is extended or adjusted under 35 U.S.C. 154(b) by 1070 days.

(21) Appl. No.: 16/504,136

(22) Filed: Jul. 5, 2019

(65) Prior Publication Data
US 2019/0321781 A1  Oct. 24, 2019

Related U.S. Application Data

(63) Continuation of application No. 14/660,923, filed on Mar. 17, 2015, now Pat. No. 10,343,115, which is a
(Continued)

(51) Int. Cl.
*B01D 53/78* (2006.01)
*B01D 53/00* (2006.01)
(Continued)

(52) U.S. Cl.
CPC .......... *B01D 53/78* (2013.01); *B01D 53/002* (2013.01); *B01D 53/75* (2013.01); *B03C 3/017* (2013.01); *B03C 3/04* (2013.01); *B03C 3/16* (2013.01); *B03C 5/02* (2013.01); *B03C 7/02* (2013.01); *B03C 11/00* (2013.01); *F23G 7/06* (2013.01); *F23J 15/006* (2013.01); *F23J 15/022* (2013.01); *B01D 47/05* (2013.01); *B01D 47/10* (2013.01); *B01D 2247/10* (2013.01); *B01D 2251/106* (2013.01); *B01D 2251/108* (2013.01); *B01D 2257/304* (2013.01); *B01D 2257/406* (2013.01); *B01D 2257/70* (2013.01); *B01D 2257/708* (2013.01); *B01D 2257/80* (2013.01);
(Continued)

(58) Field of Classification Search
None
See application file for complete search history.

(56) References Cited

U.S. PATENT DOCUMENTS 3,985,523 A  10/1976  Kaupas
4,058,375 A  11/1977  Lawrence
(Continued)

FOREIGN PATENT DOCUMENTS

JP  5467765 A  4/2014

*Primary Examiner* — Christopher P Jones
*Assistant Examiner* — Phillip Y Shao
(74) *Attorney, Agent, or Firm* — Owens Law Firm, PC

(57) ABSTRACT

A method for removing noxious, hazardous, toxic, mutagenic, and/or carcinogenic compounds and/or precursor compounds from a comingled gas, liquid, and/or solid stream is described. In one embodiment, the method is used to prepare the stream for feeding to an oxidizer, such as a thermal oxidizer, to reduce the amount of particulate matter discharged by the oxidizer and includes passing the stream through an ambient or chilled temperature condenser followed by an optional gas/solid separator, and one or more gas scrubbers prior to feeding to the oxidizer.

20 Claims, 10 Drawing Sheets

Related U.S. Application Data continuation-in-part of application No. 14/160,138, filed on Jan. 21, 2014, now Pat. No. 10,525,410.

(60) Provisional application No. 61/754,972, filed on Jan. 22, 2013.

(51) Int. Cl.

| | | |
|---|---|---|
| *B01D 53/75* | (2006.01) | |
| *B03C 3/017* | (2006.01) | |
| *B03C 3/04* | (2006.01) | |
| *B03C 3/16* | (2006.01) | |
| *B03C 5/02* | (2006.01) | |
| *B03C 7/02* | (2006.01) | |
| *B03C 11/00* | (2006.01) | |
| *F23G 7/06* | (2006.01) | |
| *F23J 15/00* | (2006.01) | |
| *F23J 15/02* | (2006.01) | |
| *B01D 47/05* | (2006.01) | |
| *B01D 47/10* | (2006.01) | |

(52) U.S. Cl.
CPC ...... *B01D 2257/90* (2013.01); *B01D 2257/93* (2013.01); *F23J 2217/102* (2013.01); *F23J 2219/40* (2013.01); *F23J 2219/70* (2013.01)

(56) References Cited

U.S. PATENT DOCUMENTS

| | | | |
|---|---|---|---|
| 4,689,156 A | 8/1987 | Zibrida | |
| 5,603,751 A * | 2/1997 | Ackerson | F26B 25/007 |
| | | | 34/480 |
| 6,190,629 B1 | 2/2001 | Solomon | |
| 6,464,875 B1 | 10/2002 | Woodruff | |
| 7,160,358 B2 * | 1/2007 | Spink | B03C 9/00 |
| | | | 96/57 |
| 7,258,848 B1 | 8/2007 | Blackwell | |
| 7,758,828 B2 * | 7/2010 | Spink | B01D 45/12 |
| | | | 34/79 |
| 8,142,727 B2 * | 3/2012 | Schmidt | F26B 23/022 |
| | | | 34/469 |
| 8,961,915 B1 | 2/2015 | Zhao | |
| 10,881,756 B2 | 1/2021 | Temple | |
| 10,898,852 B2 | 1/2021 | Temple | |
| 11,389,763 B2 | 7/2022 | Temple | |
| 11,458,436 B2 | 10/2022 | Temple | |
| 2006/0006055 A1 | 1/2006 | Bonde | |
| 2008/0053909 A1 | 3/2008 | Fassbender | |
| 2009/0078013 A1 | 3/2009 | Spindler | |
| 2009/0104099 A1 | 4/2009 | Au-Yeung | |
| 2010/0011956 A1 * | 1/2010 | Neumann | B01D 53/62 |
| | | | 261/23.1 |
| 2011/0258914 A1 * | 10/2011 | Banasiak | C10K 1/02 |
| | | | 44/605 |
| 2012/0174431 A1 * | 7/2012 | Cash | B01D 53/72 |
| | | | 34/235 |
| 2013/0028827 A1 | 1/2013 | Hickey | |
| 2014/0033776 A1 | 2/2014 | Josse | |
| 2014/0263100 A1 | 9/2014 | Kumar | |
| 2014/0363344 A1 | 12/2014 | Orentlicher | |
| 2017/0136386 A1 | 5/2017 | Temple | |
| 2021/0121820 A1 | 4/2021 | Temple | |
| 2022/0410066 A1 | 12/2022 | Temple | |
| 2023/0211280 A1 | 7/2023 | Temple | |

* cited by examiner

METHODS AND EQUIPMENT FOR TREATMENT OF ODOROUS GAS STREAMS

CROSS REFERENCE TO RELATED APPLICATIONS

This application is a continuation of prior U.S. patent application Ser. No. 14/660,923, filed Mar. 17, 2015, which is a continuation-in-part of prior U.S. patent application Ser. No. 14/160,138, filed Jan. 21, 2014, which claims the benefit of U.S. Provisional Application No. 61/754,972, filed Jan. 22, 2013, each of which is incorporated by reference herein in its entirety.

BACKGROUND

Background of the Invention

The invention and its various embodiments relate to methods and equipment for treating a vapor dominated discharge of process waste streams containing odorous, noxious, hazardous, toxic, mutagenic, and/or carcinogenic compounds and/or precursor compounds having commingled gas, liquid, and/or solid phases generated at a wide variety of industrial, commercial, and environmental processes, including, but not limited to, pet food manufacturing, food processing, food cooking, energy generation, indoor air pollution control, environmental remediation and mitigations, refining, petrochemical, chemical manufacturing, machining, printing, electronics, wood products, textiles, pulp and paper. More specifically, the invention and its various embodiments relate to the removal of odorous, noxious, hazardous, toxic, mutagenic, and/or carcinogenic compounds and/or precursor compounds contained in a multi-phase vapor waste exhaust stream having chemical vapors, solid particulates, smoke particulates, aerosols, and/or water vapor using several synergistic serial combinations of gas treatment processes specifically tasked to remove each type and phase of matter including, but not be limited to, staged condensation from near ambient to cryogenic temperatures, all manner and type of particulate removal, advanced oxidation, and/or the numerous wet scrubbing techniques.

Description of Related Art

Control of odorous, noxious, hazardous, toxic, mutagenic, and/or carcinogenic compounds and/or precursor compounds contained in multi-phase vapor waste streams of commingled gas, liquid, and/or solid phases is one of the most challenging problems faced by all facets of industrial and energy production, including the animal byproduct processing industry, referred to as "rendering." Processes designed for such control use thermal incineration (e.g. the firebox of industrial steam boilers, direct fired thermal oxidizer ("TO"), regenerative thermal oxidizer ("RTO"), regenerative catalytic oxidizer ("RCO"), thermal recuperative oxidizer ("TRO"), etc.) which are considered the current Best Available Control Technology ("BACT"). In most rendering facilities, animal byproduct is brought into a rendering plant and processed into numerous waste streams and products. Specifically, this process converts the byproduct, which consists of fresh and rotted waste animal tissue and bone, into a stable value—added material such as purified animal fats (lard, tallow, and grease) and protein meals (meat, bone meal, and blood meal). However, operation of this type of facility results in the production of various process-step specific vapor dominated process waste discharges having commingled gas, liquid, and/or solid phases containing odorous, noxious, hazardous, toxic, mutagenic, and/or carcinogenic compounds and/or precursor compounds gases that must be discharged, ultimately, to breathing spaces and/or the atmosphere.

The rendering process involves multiple steps. The following is an example of some, but not all, processes that create vapor dominated commingled gas, liquid, and/or solid process waste streams at rendering plants. First, the raw material is brought to the plant in trucks and staged for input into the raw material conveyor to the raw material grinder and the raw material metering bin. The resulting commingled gas, liquid, and/or solid waste is typically contained by a room air ventilation system and vented to breathing spaces and/or the atmosphere or treated by a number of methods (e.g. spray scrubbing, packed bed wet scrubbing, etc.). The raw animal byproduct is then "cooked" in a continuous or batch cooker (e.g., disk dryer or other processes) to evaporate moisture and to separate fat from bone and protein. The resulting material is then separated into liquid fat and solids. The resulting vapor dominated discharge of process waste streams comprising odorous, noxious, hazardous, toxic, mutagenic, and/or carcinogenic compounds and/or precursor compounds, and having commingled gas, liquid, and/or solid phases from the cooker process, contains significant quantities of fats and solid materials that are not completely separated. In addition, smoke can be generated during the cooking process. Cooking produces smoke, solid particulates, volatile organic compounds ("VOCs"), other volatile compounds such as hydrogen sulfide and ammonia, semi-volatile organic compounds ("SVOCs"), aerosolized fats, oils, greases, tallow, and wax and abundant water vapor. After cooking, the solids are processed to remove additional moisture and fats (e.g., by using a screw press) resulting in the generation of a press cake that is ultimately made into a meal product. The screw press process adds frictional heating and mechanical mixing while containing heat from the cooking process which, all together, produces a vapor dominated multi-phase process waste stream having a commingled gas, liquid, and/or solid phases comprising odorous, noxious, hazardous, toxic, mutagenic, and/or carcinogenic compounds and/or precursor compounds substances. The screw press waste stream contains smoke, solid particulates, VOCs, other volatile compounds such as hydrogen sulfide and ammonia, SVOCs, aerosolized fats, oils, greases, tallow, and wax and water vapor. Solids generated in the screw press are further subject to additional frictional heating within the auger conveyance to the grinding room and in the multi-stage grinding processes. Frictional heating in these processes evolves waste smoke, solid particulates, VOCs, other volatiles such as hydrogen sulfide and ammonia, SVOCs, aerosolized fats, oils, greases, tallow, and wax and water vapor. The liquid fat and/or fat-liquid-solid slurries are processed to remove additional gases, liquids, and/or solids (e.g., by using an evaporator system followed by a centrifuge of the fats) resulting in a liquid fat product that can be further processed into fat-based products. The evaporator and centrifuge processes results in heating under vacuum to boil off vapors, mechanical mixing, aeration while containing heat from the cooking process results in the creation of a waste commingled vapor dominated vapor dominated multi-phase process waste stream containing VOCs, other volatiles such as hydrogen sulfide and ammonia, SVOCs, aerosolized fats, oils, greases, tallow, and wax and water vapor.

Vapor dominated discharge of process waste streams having commingled gas, liquid, and/or solid phases are generated at several points in the rendering process, including, but not limited to, the unloading, conveyance, grinding of raw material followed by cooking, screw press, auger conveyance, grinding room, evaporator and centrifuge. These vapor dominated multi-phase waste streams typically contain, but are not be limited to solid organic and inorganic particulates, smoke particulates, aerosolized oils greases, tallows, waxes and water vapor having odorous, noxious, hazardous, toxic, mutagenic, and/or carcinogenic compounds and/or precursor compounds such as hydrogen sulfide, ammonia, carboxylic acids, esters, alcohols, ketones, aldehydes, amines, mercaptans, alkenes, furans, pyrazines, pyrroles, thiazoles, pyridine and other VOCs and SVOCs.

In most facilities a gaseous odor control system is used to reduce or remove some of these odorous, noxious, hazardous, toxic, mutagenic, and/or carcinogenic compounds and/or precursor compounds vapor dominated process waste discharges having commingled gas, liquid, and/or solid phases from the numerous rendering processes. For example, the vapor dominated discharge of process waste streams having commingled gas, liquid, and/or solid phases from the cooker may be sent through an ambient temperature air or water cooled condenser to partially condense those commingled gas, liquid, and/or solid phases capable of being condensed and passing the condensed material to a waste water treatment system. The remaining vapor dominated waste discharge containing partially condensed odorous, noxious, hazardous, toxic, mutagenic, and/or carcinogenic compounds and/or precursor compounds commingled gas, liquid, and/or solid phases is then sent to a gaseous odor control system such as an air scrubbing process or wet scrubber (e.g. spray condensers, spray venturi scrubbers, packed bed wet scrubbers, etc.) in which at least some of the multi-phase odorous, noxious, hazardous, toxic, mutagenic, and/or carcinogenic compounds and/or precursor compounds materials are captured by chemical and physical mechanisms into a scrubbing solution and the resulting scrubbed vapor dominated commingled gas, liquid, and/or solid phases are released into breathing spaces and/or the atmosphere. However, such scrubbing processes do not remove enough of the odorous, noxious, hazardous, toxic, mutagenic, and/or carcinogenic compounds and/or precursor compounds in the vapor dominated commingled gas, liquid, and/or solid phases. In many instances, these "high intensity vapors" are incinerated in numerous processes, including, but not limited to steam boilers, TOs, RTOs, RCOs, TROs that are considered BACT. The various methods of incineration do not address particulate matter treatment (e.g. PM2.5 and PM10), lose efficiency due to corrosive and erosive vapor dominated multi-phase process waste streams, increase maintenance and reduce equipment service life, produce odorous, noxious, hazardous, toxic, mutagenic, and/or carcinogenic compounds and/or precursor compounds air pollution and ozone precursors (e.g. nitrogen oxides ($NO_x$), sulfur oxide ($SO_x$)), which can have a large carbon footprint due to burning of natural gas and petroleum fuels and be very expensive to construct, operate, and maintain. $NO_x$ is a lung irritant and is a major precursor to the formation of ozone smog. $SO_x$ is a lung irritant and long-term exposures to low concentration, mass, and volumes cause lung function damage. $SO_x$ is also a precursor to acid rain. Since ammonia and hydrogen sulfide are the most highly concentrated compounds in rendering plant vapor dominated commingled gas, liquid, and/or solid phase process discharges, incineration will result in significantly higher production of $NO_x$ and $SO_x$ as compared with VOC thermal oxidation alone. Combined with the limited capacity for PM2.5 and PM10 removal, thermal oxidation by incineration is not well suited to treat vapor dominated discharge of process waste streams comprising odorous, noxious, hazardous, toxic, mutagenic, and/or carcinogenic compounds and/or precursor compounds having commingled gas, liquid, and/or solid phases from the numerous rendering processes. Ongoing research indicates that for the whole world, millions of people die prematurely every year due to anthropogenic particulate and ozone air pollution generated by industrial and energy plants. Therefore, a strong need exists to improve upon the treatment of these various vapor dominated discharge of process waste streams comprising odorous, noxious, hazardous, toxic, mutagenic, and/or carcinogenic compounds and/or precursor compounds having commingled gas, liquid, and/or solid phases.

SUMMARY OF THE INVENTION

In general, the present invention is directed to a process for removing odorous, noxious, hazardous, toxic, mutagenic, and/or carcinogenic compounds and/or precursor compounds from a vapor dominated discharge having commingled gas, liquid, and/or solid phases or at least reducing the concentration, mass, and volume of odorous, noxious, hazardous, toxic, mutagenic, and/or carcinogenic compounds and/or precursor compounds. The present invention provides a method and associated equipment for the progressive removal of odorous, noxious, hazardous, toxic, mutagenic, and/or carcinogenic compounds and/or precursor compounds by specifically targeting treatment of each of the multiple phases of matter that can be present in a vapor dominated commingled gas, liquid, and/or solid process waste stream. The present invention employs multiple operations of condensation of odorous, noxious, hazardous, toxic, mutagenic, and/or carcinogenic compounds and/or precursor compounds around condensation nuclei having smoke, solid particulates, and aerosols, thereby reducing the total mass of all phases in the waste stream. Primary condensation is performed in several embodiments of standard industrial process equipment, including but not limited to spray scrubbers, spray venturi scrubbers, cloud chamber scrubbers, and ambient temperature air/water condensers. Advanced condensation is performed in chilled and/or cryogenic condenser processes to drive out significant moisture and contaminants by the co-precipitation of chemical vapors, gaseous compounds, particulates, and aerosols with water vapor. Advanced condensation also increases the static charge of the remaining vapor dominated multi-phase process waste discharge composition. Advanced solid particulate and smoke particulate removal is then conducted on the remaining vapor dominated multi-phase process waste discharge composition. At this point, following solid particulate and smoke particulate treatment, the most significant remaining waste discharge will be gas phase compounds. If further treatment is necessary prior to discharge to breathing spaces and/or the atmosphere, the remaining vapor waste stream is then treated by one or more packed-bed wet scrubbers, each using a different pH setting and all containing a liquid-phase treatment (e.g. Fenton chemistry, ozone, permanganate, chlorine dioxide, chlorine, etc.). In one embodiment, the method comprises ambient temperature air/water condensation followed by wet venturi scrubbing, chilled condensing, and dry electrostatic precipitation oxidation, followed by a series of pH adjusted packed bed wet scrubbers (e.g. set to pH of 11, 7, and 2, respectively) to remove at least a portion of the odorous, noxious, hazardous, toxic, mutagenic, and/or carcinogenic compounds and/or precursor compounds contained in vapor dominated process waste discharges having commingled gas, liquid, and/or solid phases.

The present invention is also directed to processes for pre-treating a gas stream or vapor dominated process waste discharges having commingled gas, liquid, and/or solid phases comprising odorous, noxious, hazardous, toxic, mutagenic, and/or carcinogenic compounds and/or precursor compounds prior to feeding the discharge stream to an oxidizer or combustion device, such as a thermal oxidizer. In one embodiment, a method for removing compounds from a gas stream prior to feeding to an oxidizer to reduce particulate matter emissions from an oxidizer, comprises passing a gas stream comprising at least chemical compound that adds to particulate matter emissions from an oxidizer through a condenser to produce a condensed gas stream; optionally passing the condensed gas stream through a gas/solid separator; and passing the condensed gas stream through a scrubber after optionally passing the condensed gas stream through a gas/solid separator; wherein passing the gas stream through a condenser, optionally passing the condensed gas stream through a gas/solid separator, and passing the condensed gas stream through a scrubber are each performed prior to feeding the condensed gas stream to an oxidizer or combustion device.

DETAILED DESCRIPTION OF THE INVENTION

Figure 1:
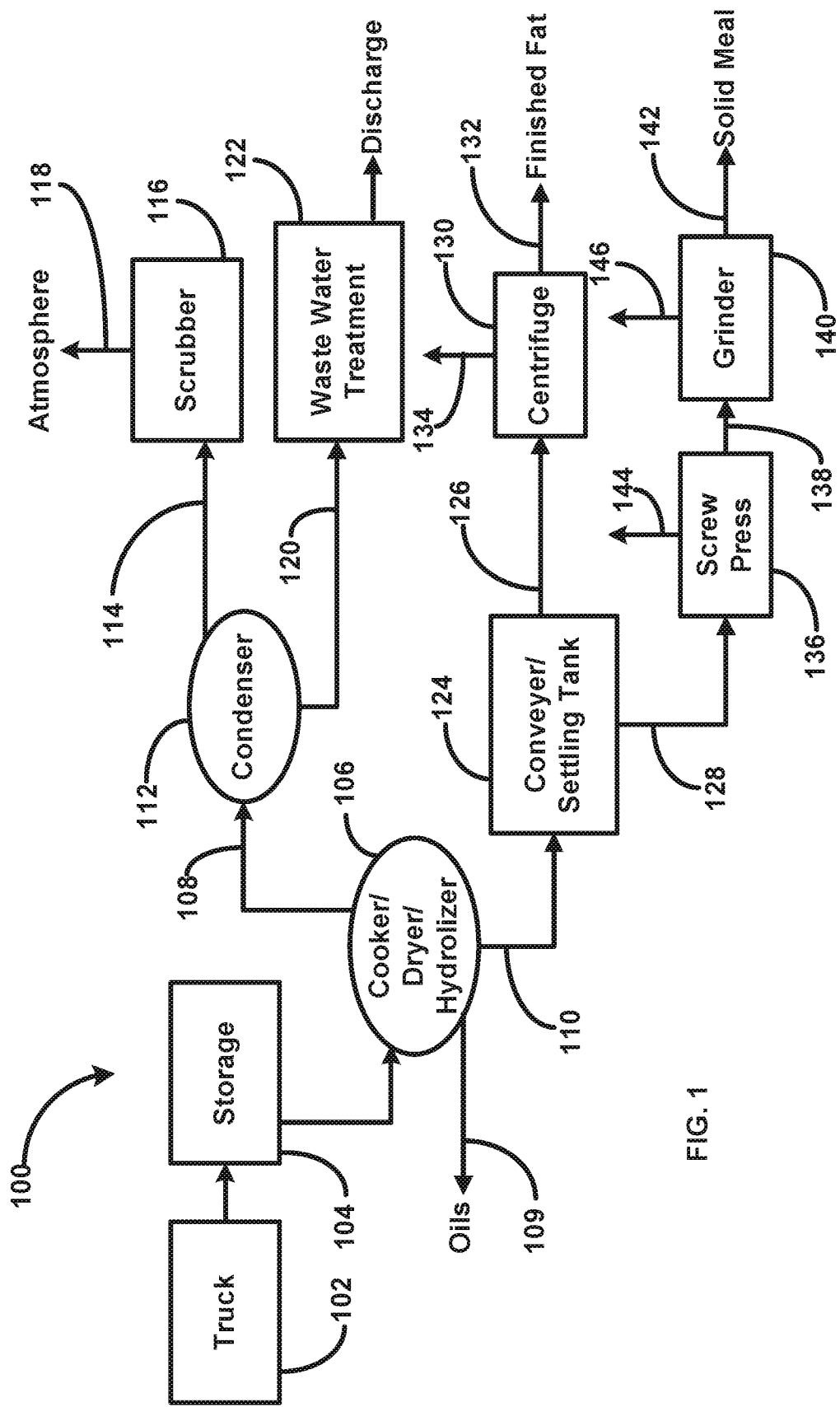
FIG. 1 is a process flow diagram illustrating a rendering process and related vapor dominated process waste discharges having commingled gas, liquid, and/or solid phases that may be treated according to the present invention.

The present invention is more fully described below with reference to the accompanying drawings. The following description is exemplary in that several embodiments are described (e.g., by use of the terms "preferably," "for example," or "in one embodiment"); however, such should not be viewed as limiting or as setting forth the only embodiments of the invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and are not intended to mean that the invention requires, or is limited to, any particular aspect being described or that such description is the only manner in which the invention may be made or used. Further, the invention may be described in the context of specific applications; however, the invention may be used in a variety of applications not specifically described.

Generally, the present invention is a process for treating one or more vapor dominated process waste discharges having commingled gas, liquid, and/or solid phases comprising odorous, noxious, hazardous, toxic, mutagenic, and/or carcinogenic compounds and/or precursor compounds to remove at least a portion of such odorous, noxious, hazardous, toxic, mutagenic, and/or carcinogenic compounds and/or precursor compounds prior to discharge to breathing spaces and/or the atmosphere. The vapor dominated process waste discharges having commingled gas, liquid, and/or solid phases may be any stream comprising odorous, noxious, hazardous, toxic, mutagenic, and/or carcinogenic compounds and/or precursor compounds, such as a vapor dominated multi-phase process waste stream generated in any industrial process, such as a rendering process. It should be appreciated that the process of the present invention can be used to treat one or more vapor dominated multi-phase process waste streams that can be first combined into one vapor dominated multi-phase process waste stream. The process for removing one or more of the odorous, noxious, hazardous, toxic, mutagenic, and/or carcinogenic compounds and/or precursor compounds includes the use of an ambient temperature air or water cooled condenser to initially condense and remove gases comprising odorous, noxious, hazardous, toxic, mutagenic, and/or carcinogenic compounds and/or precursor compounds from, and to reduce the volume of, the vapor dominated multi-phase process waste stream. It should be appreciated that at least a portion of any entrained liquids or solids comprising odorous, noxious, hazardous, toxic, mutagenic, and/or carcinogenic compounds and/or precursor compounds will also be removed in the condenser, for example, by either agglomerating to each other or to newly condensed gases. It should also be appreciated that the existing liquid and solids may also act as condensation sites or nuclei for the gases. The vapor dominated multi-phase process waste stream can also be sent (either before or after the ambient temperature condenser) to a spray venturi scrubber system to condense and remove an additional volume of gases, liquids, and/or solids comprising odorous, noxious, hazardous, toxic, mutagenic, and/or carcinogenic compounds and/or precursor compounds. The remaining, progressively depleted vapor dominated multi-phase process waste stream is then sent to a chilled condenser to condense and remove additional gases, liquids, and/or solids comprising odorous, noxious, hazardous, toxic, mutagenic, and/or carcinogenic compounds and/or precursor compounds from and to reduce the volume of the vapor dominated multi-phase process waste stream. The waste stream is then passed to a dry or wet electrostatic precipitator (ESP) that removes aerosols, solid, and smoke particulates. It should be appreciated that the chilled condenser increases the static charge of the remaining depleted vapor dominated multi-phase process waste stream, which increases the effectiveness of the ESP. In addition, the ESP corona-plasma generates ozone that oxidizes odorous, noxious, hazardous, toxic, mutagenic, and/or carcinogenic compounds and/or precursor compounds. The lower volume, remaining highly depleted vapor dominated multi-phase process waste stream is then passed through a gas/liquid contactor, including, for example, a series of three gas/liquid packed wet scrubbers (one at a high-range pH, one at a low-range pH and one at a neutral-range pH in various orders), to remove certain vapor dominated multi-phase process waste stream compounds, including odorous, noxious, hazardous, toxic, mutagenic, and/or carcinogenic compounds and/or precursor compounds. The solubility of certain vapor dominated multi-phase process waste stream compounds in a given scrubbing solution are dependent on the pH of the different scrubbing solutions. It should be appreciated that by chilling the vapor dominated multi-phase process waste stream in the upstream condensers and spray scrubber processes, the temperature of the gas stream is reduced, thereby increasing the solubility of certain vapor dominated multi-phase process waste stream compounds in the scrubbing solution used in the gas/liquid contactor. Each packed wet scrubber solution will contain a liquid-phase treatment (e.g. Fenton chemistry, ozone, permanganate, chlorine dioxide, chlorine, etc.) to destroy and/or neutralize at least a portion of the entrained gases, liquids, and/or solids comprising odorous, noxious, hazardous, toxic, mutagenic, and/or carcinogenic compounds and/or precursor compounds.

It should be appreciated that the present invention provides several advantages particularly for use in connection with a rendering process. Therefore, the present invention and its various embodiments will be described in the context of a rendering process. However the description that follows, while provided in the context of a rendering process, should not be construed as limiting the application of the present invention to such rendering processes. In other words, the present invention may be applied to any process in which there are vapor dominated process waste discharges having commingled gas, liquid, and/or solid phases containing odorous, noxious, hazardous, toxic, mutagenic, and/or carcinogenic compounds and/or precursor compounds or processes in which there are vapor dominated process waste discharges having commingled gas, liquid, and/or solid phases containing odorous, noxious, hazardous, toxic, mutagenic, and/or carcinogenic compounds and/or precursor compounds that have been condensed or cooled but for which this condensation or cooling step does not provide sufficient or desired removal of such odorous, noxious, hazardous, toxic, mutagenic, and/or carcinogenic compounds and/or precursor compounds. Further, the present invention may be applied to any of the foregoing processes in which multiple vapor dominated process waste discharges having commingled gas, liquid, and/or solid phases containing odorous, noxious, hazardous, toxic, mutagenic, and/or carcinogenic compounds and/or precursor compounds exist that can be combined together and treated according to one or more embodiments of the present invention.

In a typical rendering process, several vapor dominated multi-phase process waste streams containing odorous, noxious, hazardous, toxic, mutagenic, and/or carcinogenic compounds and/or precursor compounds are generated. By combining these streams into a single stream and treating that stream according to the process of the present invention multiple benefits may be realized. For example, in some rendering processes, certain of the vapor dominated multi-phase process waste streams containing odorous, noxious, hazardous, toxic, mutagenic, and/or carcinogenic compounds and/or precursor compounds are conveyed to a boiler or the various embodiments of thermal oxidation for incineration, which results in additional operating costs for fuel and maintenance of the boiler and/or or additional capital and operating costs for a thermal oxidizer. By using the present invention, these costs may be reduced or eliminated. Since typical rendering waste streams contain high concentration, mass and volumes of ammonia and hydrogen sulfide, incineration produces high concentration, mass and volumes of $NO_x$ and $SO_x$. In addition, hydrogen sulfide and ammonia are both highly corrosive compounds that are not compatible with incineration and boiler equipment. A typical rendering plant vapor dominated multi-phase process waste stream being treated by incineration will contain high levels of solid particulates, smoke particulates, and aerosolized fats and oils. These materials are not ideally treated by incineration and increase equipment wear and tear, maintenance, and operating costs. Incinerators also consume large, expensive amounts of natural gas, producing the greenhouse gas carbon dioxide, which may be regulated as a pollutant.

FIG. 1 is a process flow diagram illustrating a rendering process and related vapor dominated process waste discharges having commingled gas, liquid, and/or solid phases that may be treated according to the present invention. In this process 100, a truck 102 will typically dump various animal byproduct materials into a storage tank 104. This byproduct material is feed to a cooker 106, which may be a rotary or disk dryer or hydrolizer. The cooker 106 adds heat to the byproduct material to drive off water as an aerosol and/or vapor and to separate fat from the bone and protein. As a result, the cooker 106 produces a vapor dominated commingled gas, liquid, and/or solid process waste stream 108, an oils stream 109, and a solids stream 110. It should be appreciated that if a rotary or disk dryer or hydrolizer is used, typically only two streams are produced, a vapor dominated commingled gas, liquid, and/or solid process waste stream and a solids stream that also comprises oils.

The vapor dominated commingled gas, liquid, and/or solid process waste stream 108 from the cooker 106, which contains various odorous, noxious, hazardous, toxic, mutagenic, and/or carcinogenic compounds and/or precursor compounds, is passed to a ambient temperature air or water condenser 112 where the vapor dominated multi-phase process waste stream 108 is cooled to partially condense gases and to remove liquids and/or solids through, for example, agglomeration or combination of entrained liquids and solids together or onto newly condensed gases or vice versa, thereby separating as many of the condensable chemical vapors, solid particulates, smoke particulates, aerosols, and water vapor from the vapor dominated process waste stream. In processes currently used in the rendering industry, condensing of the vapor dominated multi-phase process waste 108 is done using either ambient air in an air cooled condenser or surface water, well water, or recycle water in a tube and shell condenser. In all of these cases, however, the temperature of the cooling media is usually ambient temperature (noting that in some cases a cooling tower may be used to cool the cooling water but still to within a few degrees of ambient) such that a portion of the vapor dominated commingled gas, liquid, and/or solid process waste stream does not condense in the condenser 112 and remains a significant vapor dominated multi-phase process waste stream, which may require additional treatment prior to discharge to breathing spaces and/or the atmosphere.

The ambient temperature condenser 112 produces a lower volume vapor dominated multi-phase process waste stream 114, which contains various odorous, noxious, hazardous, toxic, mutagenic, and/or carcinogenic compounds and/or precursor compounds that were not condensed, that is subsequently passed to a scrubber 116 where at least portions of certain components are removed from the vapor dominated multi-phase process waste stream, including certain portions of the remaining odorous, noxious, hazardous, toxic, mutagenic, and/or carcinogenic compounds and/or precursor compounds. It should be appreciated that a number of treatment processes could be used in place of the scrubber 116, including, for example, incineration, etc. The scrubber 116 discharges the remaining treated vapor dominated multi-phase process waste stream 118 to breathing spaces and/or the atmosphere.

The condenser 112 also produces a condensate stream 120 that is passed to a waste water treatment system 122 for ultimate discharge. The waste water treatment system 122 may include a waste water pre-treatment system that separates sludge, liquid, and solids from each other prior to discharge. It should be appreciated that the waste water pre-treatment system 122 may be a diffused or induced air flotation system because the solids and oil are more likely to separate and float than separate and sink. In some cases the waste water pre-treatment system 122 may include biological digestion of the soluble fraction that is measured as biological oxygen demand, as well as the use of nitrifying bacteria to remove the nitrogen loading prior to surface discharge of discharge to a municipality. It should be appreciated that instead of a condensate stream 120 being passed to a waste water treatment system 122, the condensate stream 120 can be further treated and refined to concentrate the ammonia to create an organic fertilizer product.

The solids stream 110 from the cooker 106 is passed to a conveyor/settling tank 124 that further separates solids from liquids to produce a liquid stream 126 and another solids stream 128. The liquid stream 126 is processed by a centrifuge 130, which produces a stream of finished fat 132 for sale or for further processing and refinement. Vapors, solid particulates, smoke particulates, aerosols and water vapor 134 are also produced during operation of the centrifuge 130 that may contain odorous, noxious, hazardous, toxic, mutagenic, and/or carcinogenic compounds and/or precursor compounds. The solids stream 128 is further processed by a screw press 136 that produces a relatively more dry solids stream 138 that may be sent to a grinder 140 to grind the solids into a more uniform particle size distribution for sale as meal 142. Operation of both the screw press 136 and the grinder may result in the production of chemical vapors, solid particulates, smoke particulates, aerosols, and water vapor 144, 146, respectively, that may each include odorous, noxious, hazardous, toxic, mutagenic, and/or carcinogenic compounds and/or precursor compounds. Accordingly, it should be appreciated that there are at least four possible sources of chemical vapors, solid particulates, smoke particulates, aerosols, and water vapor or vapor dominated multi-phase process waste streams that may contain odorous, noxious, hazardous, toxic, mutagenic, and/or carcinogenic compounds and/or precursor compounds, including the vapor dominated multi-phase process waste stream 114 produced by the "ambient temperature" condenser 112, which includes the partially condensed odorous, noxious, hazardous, toxic, mutagenic, and/or carcinogenic compounds and/or precursor compounds, the chemical vapors, solid particulates, smoke particulates, aerosols, and water vapor 134 produced from the centrifuge 130, the chemical vapors, solid particulates, smoke particulates, aerosols, and water vapor 144 produced from the screw press 136, and the chemical vapors, solid particulates, smoke particulates, aerosols, and water vapor 146 produced from the grinder 140. In some rendering processes these various vapor dominated multi-phase process waste streams are further treated to remove odorous, noxious, hazardous, toxic, mutagenic, and/or carcinogenic compounds and/or precursor compounds by feeding such streams to an existing boiler or the various embodiments of thermal oxidation for incineration. In these cases, additional fuel for the boiler is required or a thermal oxidation device must be purchased and operated incurring additional capital and operating costs. The typical rendering vapor dominated multi-phase process waste stream contains solid particulates, smoke particulates, aerosolized oils, fats, greases, tallow, and waxes that can corrode, erode or create deposits within boilers and thermal oxidation equipment which then requires frequent cleaning and repairs. High levels of ammonia and hydrogen sulfide contribute to excess $NO_x$ and $SO_x$, which are responsible for photochemical smog (ozone) and acid rain. The various embodiments of incineration are not appropriate treatment processes for particulate removal, including PM2.5 and PM10.

Figure 2:
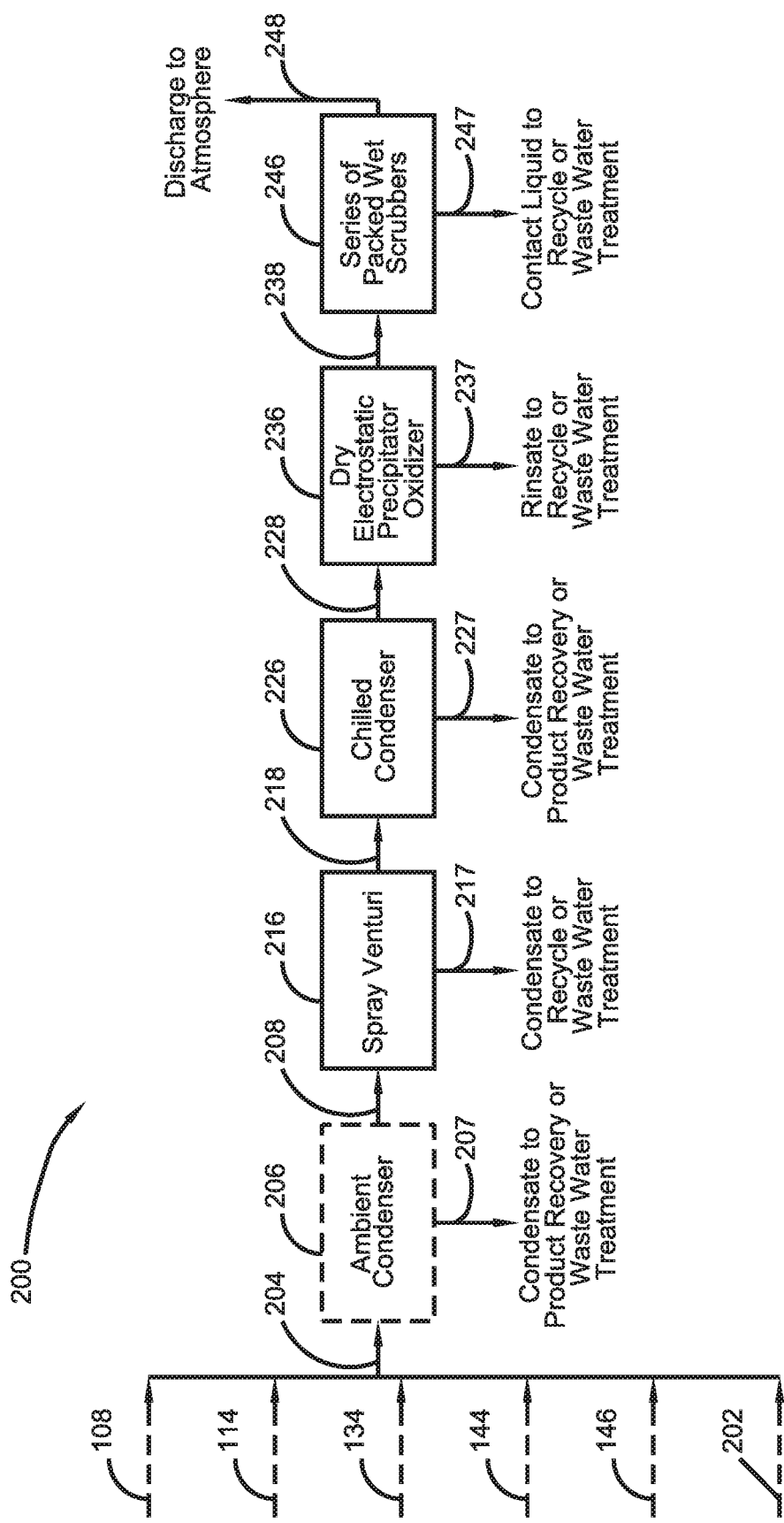
FIG. 2 illustrates a flow diagram of a process for treating one or more vapor dominated process waste discharges having commingled gas, liquid, and/or solid phases containing odorous, noxious, hazardous, toxic, mutagenic, and/or carcinogenic compounds and/or precursor compounds according to one embodiment of the present invention.

FIG. 2 illustrates a flow diagram of a process for treating one or more vapor dominated process waste discharges having commingled gas, liquid, and/or solid phases containing odorous, noxious, hazardous, toxic, mutagenic, and/or carcinogenic compounds and/or precursor compounds according to one embodiment of the present invention. The process 200 shown in FIG. 2 provides for treatment of vapor dominated multi-phase process waste streams containing odorous, noxious, hazardous, toxic, mutagenic, and/or carcinogenic compounds and/or precursor compounds. As noted above, the rendering process 100 illustrated in FIG. 1 produces at least five vapor dominated multi-phase process waste streams that may contain odorous, noxious, hazardous, toxic, mutagenic, and/or carcinogenic compounds and/or precursor compounds that require treatment, including, for example, removal of at least a portion of the odorous, noxious, hazardous, toxic, mutagenic, and/or carcinogenic compounds and/or precursor compounds, prior to discharge to breathing spaces and/or the atmosphere. These five streams 108, 114, 134, 144, 146 from FIG. 1 are shown in FIG. 2 along with a generic stream 202 that represents any vapor dominated multi-phase process waste stream containing at least one odorous, noxious, hazardous, toxic, mutagenic, and/or carcinogenic compounds and/or precursor compounds. It should be appreciated that any one or more of these streams may be treated as described herein. Further, it should be appreciated that these streams may be initially combined and treated as a single stream. Accordingly, since the treatment of these various streams or their combination is optional, these streams are shown as dashed lines.

Any one or more of the multi-phase vapor dominated process waste streams 108, 114, 134, 144, 146, 202 containing at least one or more odorous, noxious, hazardous, toxic, mutagenic, and/or carcinogenic compounds and/or precursor compounds may be combined into a single stream 204 and optionally fed to an ambient temperature air or water condenser 206 where the vapor dominated multi-phase process waste stream is cooled to partially condense gases and to remove liquids and/or solids through, for example, agglomeration or combination of entrained liquids and solids together or onto newly condensed gases or vice versa, thereby separating as many of the condensable vapors, solid particulates, smoke particulates, aerosols, and water vapor from the waste stream 204. It should be appreciated that one or more of these streams 108, 114, 134, 144, 146, 202 may individually be passed through the ambient condenser 206 and then combined with the other streams, which have not been passed through the condenser 206. For example, the cooker multi-phase vapor dominated process waste stream 108 may be fed into ambient temperature air or water condenser 112 as shown on FIG. 1 prior to combining with other vapor dominated multi-phase process waste streams. The ambient temperature condenser discharge 208 is fed into a gas/solid separator 216, such as a spray venturi, for separation of at least a portion of any entrained gas, liquid, and/or solid phases containing odorous, noxious, hazardous, toxic, mutagenic, and/or carcinogenic compounds and/or precursor compounds 217, which can be recycled via a filtration system or discharged to a waste water treatment system. In a rendering process, the multi-phase vapor dominated process waste streams may contain oil or meal particles (e.g., smoke and carbon particulate) generated from the centrifuge 130 or the screw press 136 or both that can be reduced using the ambient temperature condenser 206 and/or the spray venturi 216. It should be appreciated that the combination of these various vapor dominated multi-phase process waste streams 108, 114, 134, 144, 146, 202 into the single stream 204 allows for treatment of a single stream versus separate treatment of multiple streams, which is a more efficient process for removing at least a portion of the odorous, noxious, hazardous, toxic, mutagenic, and/or carcinogenic compounds and/or precursor compounds from these various vapor dominated multi-phase process waste streams. However, it should be appreciated that any one of these streams may be treated individually using the present invention without combining the stream with any other stream. Further, it should be appreciated that, in particular, in those processes illustrated on FIG. 1 in which the vapor dominated multi-phase process waste stream 114 exiting the condenser 112 is alternatively passed directly to one of many combustion devices, such as steam boilers, TOs, RTOs, RCOs, TROs for combustion, such vapor dominated multi-phase process waste stream 114 may be instead treated using any of the various embodiments of the present invention prior to entering the combustion device to reduce the vapor dominated multi-phase process waste stream mass and volume, minimize resulting air pollution (e.g. water vapor, particulates, $NO_x$, $SO_x$, etc.) and decrease the impact of those vapor dominated multi-phase process waste stream compounds that are detrimental to the combustion device itself, such as vapor dominated multi-phase process waste stream compounds that, for example, corrode, erode, or otherwise deteriorate the combustion equipment.

Any one or more of the vapor dominated multi-phase process waste streams 108, 114, 134, 144, 146, 202 or the combined vapor dominated multi-phase process waste stream 204, or the vapor dominated multi-phase process waste stream 208 exiting the ambient temperature condenser 206 is passed to a spray venturi 216 thereby further reducing the resulting vapor dominated multi-phase process waste stream 218 mass and volume of odorous, noxious, hazardous, toxic, mutagenic, and/or carcinogenic compounds and/or precursor compounds. Any one or more of the vapor dominated multi-phase process waste streams 108, 114, 134, 144, 146, 202, 208 and 218 or the combined vapor dominated multi-phase process waste stream 204 is passed to a chilled condenser 226, thereby further reducing the resulting vapor dominated multi-phase process waste stream 228 mass and volume of odorous, noxious, hazardous, toxic, mutagenic, and/or carcinogenic compounds and/or precursor compounds. This chilled condenser 226 is operated to chill the input vapor dominated multi-phase process waste stream to a predetermined temperature for numerous reasons, including to condense any remaining water vapor, or a majority of such water vapor, from the vapor dominated multi-phase process waste stream; to condense and remove certain odorous, noxious, hazardous, toxic, mutagenic, and/or carcinogenic compounds and/or precursor compounds, such as VOCs, SVOCs, ammonia, hydrogen sulfide, solid particulates; to condense and remove certain components, such as aerosol oils fats greases, waxes, from the vapor dominated multi-phase process waste stream; and to reduce the volume of the vapor dominated multi-phase process waste stream. In some embodiments, the condenser 226 is operated to chill the vapor dominated multi-phase process waste stream to a temperature of approximately 50° F. or less, approximately 36° F. or less, or approximately −40° F. or less. The condenser 226 produces a chilled vapor dominated multi-phase process waste stream 212 that exits the condenser 226. It should be appreciated that the condenser 226 will also remove at least a portion of any entrained liquids and/or solids that comprise odorous, noxious, hazardous, toxic, mutagenic, and/or carcinogenic compounds and/or precursor compounds through, for example, agglomeration or combination of entrained liquids and solids together or onto newly condensed gases or vice versa.

It should be appreciated that in those embodiments in which the condenser 226 is used to chill the vapor dominated multi-phase process waste stream to less than 32° F. two condensers may be necessary, including, for example, the use of a glycol solution as the working fluid in either or both of the condensers. It should also be appreciated that in operation, two condensers may be used to allow continuous operation (or four condensers in the embodiment in which the vapor dominated multi-phase process waste stream is chilled to less than 32° F.). In this case, one condenser can be in operation while the second condenser is being cleaned. The two condensers can then be reversed wherein the second condenser is put into operation while the first condenser is cleaned.

The condensed material removed by the chilled condenser 226 from any one or more of the vapor dominated multi-phase process waste streams 108, 114, 134, 144, 146, 202, 208, and 218 or the combined vapor dominated multi-phase process waste stream 204, including, for example, condensed water vapor, condensed solid and smoke particulates, condensed VOCs and SVOCs, condensed ammonia and hydrogen sulfide, and condensed oils fats, greases, and waxes is discharged from the condenser 226 as a liquid stream 227. This liquid stream 227 may be discharged to a mechanical/chemical separation process system to create marketable products (e.g. organic fertilizer, animal feed supplement, etc.) or to a waste water treatment system.

The chilled vapor dominated multi-phase process waste stream 228 that exits the condenser 226 is passed to a particulate collection device 236, such as a dry electrostatic precipitator (ESP), to remove entrained solid and smoke particles, aerosolized oils, fats, greases, and waxes remaining in the vapor dominated multi-phase process waste stream 228. It should be appreciated that by condensing gases entrained in the vapor dominated multi-phase process waste stream in the chilled condenser 226 prior to feeding the chilled vapor dominated multi-phase process waste stream 228 to a dry ESP 236 allows the dry ESP 236 to operate more efficiently due to lower overall mass and volume of the vapor dominated multi-phase process waste stream, lower moisture content, lower temperature and increased static charge. High temperatures, high moisture content, and aerosolized oils fats greases, waxes carried into an ESP may combine to reduce the electrostatic efficiency, foul the wires and the collection plates in the dry ESP prematurely causing a reduction in its removal efficiency or a reduction in its availability for use since it may have to be cleaned more frequently. In addition, the chilled condensation process increases the static charge of the vapor dominated multi-phase process waste stream 228, thereby increasing the efficiency of the dry ESP. Ozone created by corona-plasma in the dry ESP oxidizes odorous, noxious, hazardous, toxic, mutagenic, and/or carcinogenic compounds and/or precursor compounds within the vapor dominated multi-phase process waste stream. The dry ESP is periodically cleaned by an automated system that sprays hot water/surfactant under high pressure. The rinsate may be recycled and/or discharged to and treatment by a waste water treatment system. It should be appreciated that a series of dry ESPs may be used and multiple dry ESPs may be used to allow for continuous operation with one dry ESP and simultaneous cleaning or a second dry ESP. In some embodiments, the dry ESP may contain ultraviolet (UV) lights to enhance UV/ozone surface cleaning of the plates and as an enhancement of the ozone oxidation of odorous, noxious, hazardous, toxic, mutagenic, and/or carcinogenic compounds and/or precursor compounds via photo-Fenton. The UV light enhanced dry ESP mimics atmospheric photochemistry that produces a hydroxyl radical by the photolysis of ozone by ultraviolet light in the presence of water vapor. The UV/ozone photo-Fenton oxidation potential, in some embodiments, is enhanced by the addition of oxygen gas, ozone, and/or hydrogen peroxide spray immediately upstream of the dry ESP 236. Further, in some embodiments, a wet ESP (WESP) may be used to reduce the cleaning otherwise required with a dry ESP. Further, in some embodiments, a WESP or dry ESP may contain collection plates coated with a conductive hydrophilic or superhydrophilic material, such as titanium dioxide, to reduce the cleaning otherwise required.

The particulate collection device 236 produces a vapor dominated multi-phase process waste stream 238 having a reduced concentration, mass, and volume of entrained gases, solids, and liquids that is fed to a series of gas/liquid contactors 246, such as packed wet scrubber, to remove at least a portion of the remaining odorous, noxious, hazardous, toxic, mutagenic, and/or carcinogenic compounds and/or precursor compounds in the vapor dominated multi-phase process waste stream 238. The gas/liquid contactors 246 produces a vapor dominated multi-phase process waste stream 248 having a reduced concentration, mass, and volume of odorous, noxious, hazardous, toxic, mutagenic, and/or carcinogenic compounds and/or precursor compounds for discharge to breathing spaces and/or the atmosphere and a liquid blowdown stream 247 for either recycling and/or discharge to, and treatment by, a waste water treatment system. It should be appreciated that various gas/liquid contactors may be used in varying arrangements and under various operating conditions with various scrubbing solutions. In some embodiments, the gas/liquid contactors 246 may be any gas/liquid contactors or devices that bring a gas into contact with a liquid in which the liquid serves as a scrubbing solution to remove at least a portion of some gas, liquid, and/or solid phase contaminants, including odorous, noxious, hazardous, toxic, mutagenic, and/or carcinogenic compounds and/or precursor compounds. Accordingly, the scrubbing solution may be any solution that has a capacity to remove vapor dominated multi-phase process waste stream compounds or that assists in the removal given vapor dominated multi-phase process waste stream compounds. Some of the various embodiments for the gas/liquid contactor 246 are now described.

In general, the gas/liquid contractors 246 are used to remove, or at least reduce, the concentration, mass, and volume of at least one odorous, noxious, hazardous, toxic, mutagenic, and/or carcinogenic compounds and/or precursor compounds in the vapor dominated multi-phase process waste streams. In one embodiment, a series of two gas/liquid contactors is used, each having a different liquid scrubbing solution. In this case, the vaporous stream containing one or more odorous vaporous compounds is passed through a first gas/liquid contactor. A scrubbing solution is used to absorb at least a portion of one or more odorous vaporous compounds from the vaporous stream. The vaporous stream then exits the first gas/liquid contactor and is passed to a second gas/liquid contactor. A different scrubbing solution is then used to absorb at least a portion of one or more odorous vaporous compounds from the vaporous stream, which may include some of the same odorous vaporous compounds absorbed in the first gas/liquid contactor or different odorous vaporous compounds. As noted, the vaporous stream is then discharged, for example, to the atmosphere. It should be appreciated that in many industrial facilities, including rendering facilities, that existing gas/liquid contactors may be used as the gas/liquid contactor 220 in the present invention with little or minimal retrofit requirements.

In one embodiment, the scrubbing solution used in the first gas/liquid contactor is an alkaline scrubbing solution. In some embodiments, the pH of this scrubbing solution is greater than 7.0, 7.5, 8.0, 8.5, 9.0, 9.2, or 9.5 or higher. In some embodiments, this scrubbing solution includes hydrogen peroxide alone or other oxidizing compounds such as $ClO_2$, bleach, ozone, etc. In some embodiments, this scrubbing solution includes hydrogen peroxide and a hydrogen peroxide decomposition additive that catalyzes the decomposition of the hydrogen peroxide to enhance the effectiveness of the scrubbing solution to absorb the odorous vaporous compounds. In this case, the scrubbing solution will contain the reaction product or products or the decomposition of the hydrogen peroxide.

In one embodiment, the scrubbing solution used in the second gas/liquid contactor is an acidic scrubbing solution.

In some embodiments, the pH of this scrubbing solution is less than 7.0, 6.5, 6.0, 5.5, or 5.0 or lower. In some embodiments, this scrubbing solution includes hydrogen peroxide alone or other oxidizing compounds such as $ClO_2$, bleach, ozone, etc. In some embodiments, this scrubbing solution includes hydrogen peroxide and a hydrogen peroxide decomposition additive that catalyzes the decomposition of the hydrogen peroxide to enhance the effectiveness of the scrubbing solution to absorb the odorous vaporous compounds. In this case, the scrubbing solution will contain the reaction product or products or the decomposition of the hydrogen peroxide.

The hydrogen peroxide decomposition additive may include any chemical that catalyzes the decomposition of hydrogen peroxide. For example, chemical elements selected from groups 3B, 4B, 5B, 6B, 7B, 8B, 1B, and 2B of the Periodic Table of Elements, such as fluorine; "d" block transition elements, such as cobalt; a source of ferrous or ferric ion, such as ferrous sulfate or ferric sulfate; or ozone may be used as hydrogen peroxide decomposition additives, alone or in combination. Such hydrogen peroxide decomposition additives and their use in rendering processes are described in U.S. Pat. No. 7,550,123, entitled "Method and Apparatus for Use of Reacted Hydrogen Peroxide Compounds in Industrial Process Waters," which is incorporated by reference herein in its entirety.

It should be appreciate that by using two scrubbers each with scrubbing solutions at different pHs, such an alkaline scrubbing solution or a scrubbing solution with a pH greater than 7.0 and an acidic scrubbing solution or a scrubbing solution with a pH less than 7.0, more odorous vaporous compounds may be absorbed since not all such compounds can be absorbed at the same pH, such as in a single scrubbing using a single scrubbing solution at a single pH. Moreover, it should be appreciated that the scrubbing solutions used in the two different gas/liquid contactors may be periodically switched. For example, an alkaline scrubbing solution used in a first gas/liquid contactor may be used in the second or downstream gas/liquid contactor and the acidic scrubbing solution used in a second gas/liquid contactor may be used in the first or upstream gas/liquid contactor. This may be done, for example, to dissolve or remove any scale buildup using the acidic scrubbing solution that has occurred in the first gas/liquid contactor during operation with the alkaline scrubbing solution and vice versa. Accordingly, operation of both gas/liquid contractors to remove odorous vaporous components from a gas stream can be continued or maintained while concurrently cleaning the inside of the scrubber, for example, by removing scale buildup. After such scale buildup has been sufficiently removed, the scrubbing solutions can be reversed again and used as initially operated in their respective gas/liquid contactors.

It should be appreciated that other components can be added to either the acidic scrubbing solution or the alkaline scrubbing solution or both. For example, a chelating agent can be added in those embodiments in which a hydrogen peroxide decomposition additive is used to increase the solubility of this additive. Further still, other components such as a non-ionic wetting agent or a low molecular weight dispersant polymer may be added to either scrubbing solution. Such other additives and their use in rendering processes are also described in U.S. Pat. No. 7,550,123, entitled "Method and Apparatus for Use of Reacted Hydrogen Peroxide Compounds in Industrial Process Waters."

In another embodiment, a series of three gas/liquid contactors is used, each having a different liquid scrubbing solution. In this case, the vapor dominated multi-phase process waste stream containing one or more odorous, noxious, hazardous, toxic, mutagenic, and/or carcinogenic compounds and/or precursor compounds is passed through a first gas/liquid contactor. A scrubbing solution is used to absorb at least a portion of one or more odorous, noxious, hazardous, toxic, mutagenic, and/or carcinogenic compounds and/or precursor compounds from the vapor dominated multi-phase process waste stream. The vapor dominated multi-phase process waste stream then exits the first gas/liquid contactor and is passed to a second gas/liquid contactor. A different scrubbing solution is then used to absorb at least a portion of one or more odorous, noxious, hazardous, toxic, mutagenic, and/or carcinogenic compounds and/or precursor compounds from the vapor dominated multi-phase process waste stream, which may include some of the same odorous, noxious, hazardous, toxic, mutagenic, and/or carcinogenic compounds and/or precursor compounds absorbed in the first gas/liquid contactor or different odorous, noxious, hazardous, toxic, mutagenic, and/or carcinogenic compounds and/or precursor compounds in the vapor dominated multi-phase process waste stream. The vapor dominated multi-phase process waste stream then exits the second gas/liquid contactor and is passed to a third gas/liquid contactor. A different scrubbing solution is then used to absorb at least a portion of one or more odorous, noxious, hazardous, toxic, mutagenic, and/or carcinogenic compounds and/or precursor compounds from the vapor dominated multi-phase process waste stream, which may include some of the same odorous, noxious, hazardous, toxic, mutagenic, and/or carcinogenic compounds and/or precursor compounds absorbed in the first and second gas/liquid contactors or different odorous, noxious, hazardous, toxic, mutagenic, and/or carcinogenic compounds and/or precursor compounds in the vapor dominated multi-phase process waste stream. As noted, the highly treated vapor dominated multi-phase process waste stream is then discharged, for example, to either breathing spaces or to the atmosphere. It should be appreciated that in many industrial facilities, including rendering facilities, that existing gas/liquid contactors may be used as the gas/liquid contactor 246 in the present invention with little or minimal retrofit requirements.

In one embodiment using three scrubbers, the scrubbing solution used in the first gas/liquid contactor is an alkaline scrubbing solution. In some embodiments, the pH of this scrubbing solution is greater than 7.0, 7.5, 8.0, 8.5, 9.0, 9.2, or 9.5 or higher. In some embodiments, this scrubbing solution includes hydrogen peroxide alone or other oxidizing compounds such as $ClO_2$, bleach, ozone, etc. In some embodiments, this scrubbing solution includes hydrogen peroxide and a hydrogen peroxide decomposition additive that catalyzes the decomposition of the hydrogen peroxide to enhance the effectiveness of the scrubbing solution to absorb the odorous, noxious, hazardous, toxic, mutagenic, and/or carcinogenic compounds and/or precursor compounds in the vapor dominated multi-phase process waste streams. In this case, the scrubbing solution will contain the reaction product or products or the decomposition of the hydrogen peroxide.

In one embodiment using three scrubbers, the scrubbing solution used in the second gas/liquid contactor is an acidic scrubbing solution. In some embodiments, the pH of this scrubbing solution is less than 7.0, 6.5, 6.0, 5.5, or 5.0 or lower. In some embodiments, this scrubbing solution includes hydrogen peroxide alone or other oxidizing compounds such as $ClO_2$, bleach, ozone, etc. In some embodiments, this scrubbing solution includes hydrogen peroxide and a hydrogen peroxide decomposition additive that catalyzes the decomposition of the hydrogen peroxide to enhance the effectiveness of the scrubbing solution to absorb the odorous, noxious, hazardous, toxic, mutagenic, and/or carcinogenic compounds and/or precursor compounds in the vapor dominated multi-phase process waste streams. In this case, the scrubbing solution will contain the reaction product or products or the decomposition of the hydrogen peroxide.

In one embodiment using three scrubbers, the scrubbing solution used in the third gas/liquid contactor is a neutral-range scrubbing solution. In some embodiments, the pH of this scrubbing solution is less than 9.0 and greater than 5.0. In some embodiments, this scrubbing solution includes hydrogen peroxide alone or other oxidizing compounds such as $ClO_2$, bleach, ozone, etc. In some embodiments, this scrubbing solution includes hydrogen peroxide and a hydrogen peroxide decomposition additive that catalyzes the decomposition of the hydrogen peroxide to enhance the effectiveness of the scrubbing solution to absorb the odorous, noxious, hazardous, toxic, mutagenic, and/or carcinogenic compounds and/or precursor compounds vapor dominated multi-phase process waste stream compounds. In this case, the scrubbing solution will contain the reaction product or products or the decomposition of the hydrogen peroxide.

The hydrogen peroxide decomposition additive may include any chemical that catalyzes the decomposition of hydrogen peroxide. For example, chemical elements selected from groups 3B, 4B, 5B, 6B, 7B, 8B, 1B, and 2B of the Periodic Table of Elements, such as fluorine; "d" block transition elements, such as cobalt; a source of ferrous or ferric ion, such as ferrous sulfate or ferric sulfate; or ozone may be used as hydrogen peroxide decomposition additives, alone or in combination. Such hydrogen peroxide decomposition additives and their use in rendering processes are described in U.S. Pat. No. 7,550,123, entitled "Method and Apparatus for Use of Reacted Hydrogen Peroxide Compounds in Industrial Process Waters," which is incorporated by reference herein in its entirety.

It should be appreciate that by using three scrubbers each with scrubbing solutions at different pHs, such an alkaline scrubbing solution or a scrubbing solution with a pH greater than 7.0, an acidic scrubbing solution or a scrubbing solution with a pH less than 7.0 and a neutral-range scrubbing solution with a pH greater than 5.0 and less than 9.0, more odorous, noxious, hazardous, toxic, mutagenic, and/or carcinogenic compounds and/or precursor compounds vapor dominated multi-phase process waste stream compounds may be absorbed since not all such compounds can be absorbed at the same pH, such as in a single scrubbing using a single scrubbing solution at a single pH. Moreover, it should be appreciated that the scrubbing solutions used in the three different gas/liquid contactors may be periodically switched. For example, an alkaline scrubbing solution used in a first gas/liquid contactor may be used in the second or downstream gas/liquid contactor and the acidic scrubbing solution used in a second gas/liquid contactor may be used in the first or upstream gas/liquid contactor. This might be done, for example, to dissolve or remove any scale buildup using the acidic scrubbing solution that has occurred in the first gas/liquid contactor during operation with the alkaline scrubbing solution and vice versa. Accordingly, operation of both gas/liquid contractors to remove odorous, noxious, hazardous, toxic, mutagenic, and/or carcinogenic compounds and/or precursor compounds in vapor dominated multi-phase process waste streams can be continued or maintained while concurrently cleaning the inside of the scrubber, for example, by removing scale buildup. After such scale buildup has been sufficiently removed, the scrubbing solutions can be reversed again and used as initially operated in their respective gas/liquid contactors.

It should be appreciated that other components can be added to either the acidic scrubbing solution, the alkaline scrubbing solution, the neutral-range scrubbing solution or all three. For example, a chelating agent can be added in those embodiments in which a hydrogen peroxide decomposition additive is used to increase the solubility of this additive. Further still, other components such as a non-ionic wetting agent or a low molecular weight dispersant polymer may be added to either scrubbing solution. Such other additives and their use in rendering processes are also described in U.S. Pat. No. 7,550,123, entitled "Method and Apparatus for Use of Reacted Hydrogen Peroxide Compounds in Industrial Process Waters."

Figure 3:
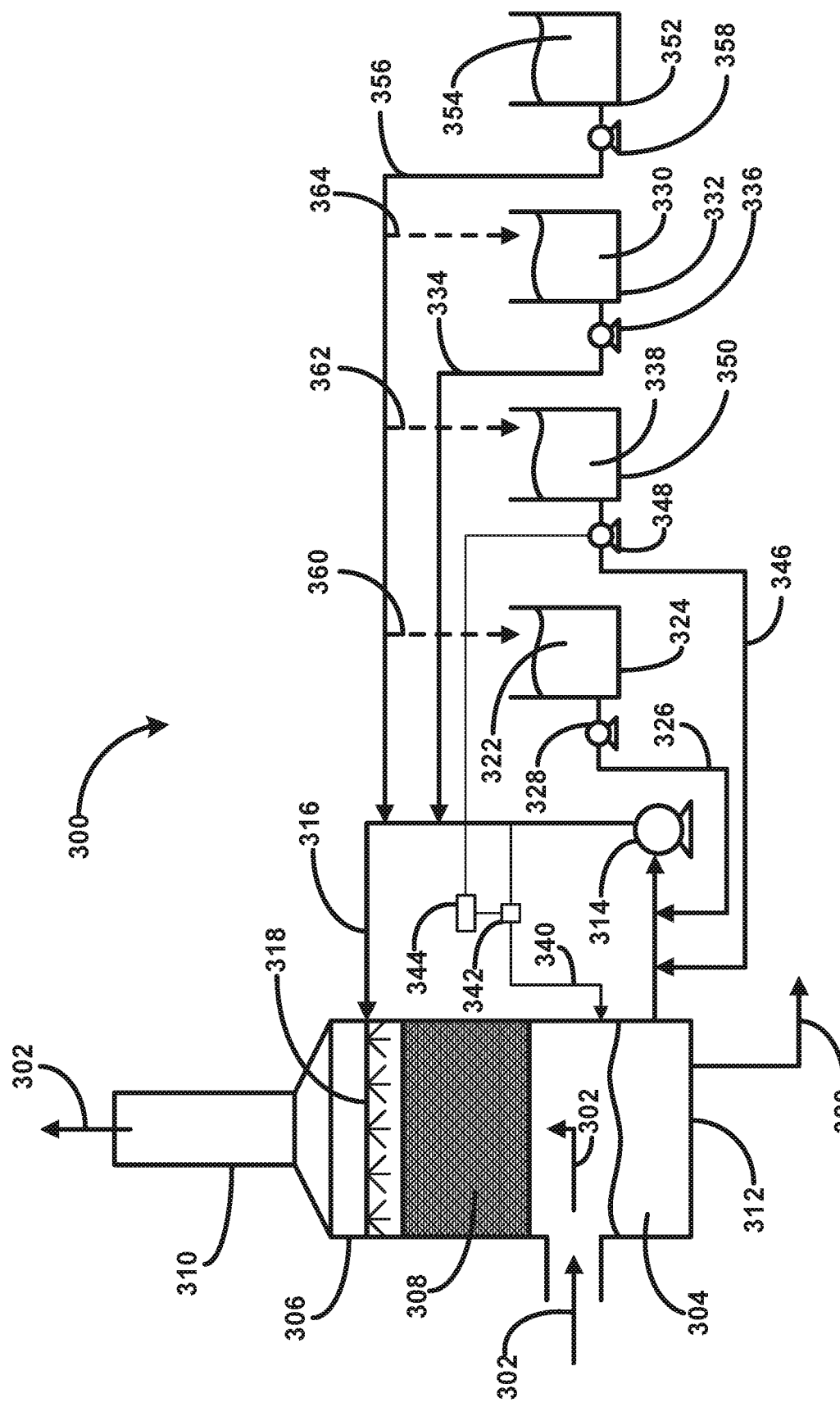
FIG. 3 illustrates a process flow diagram for one of the gas/liquid contactors that can be used as the scrubber shown in FIGS. 2, 6, and 8.

FIG. 3 illustrates a process flow diagram for one of the gas/liquid contactors that can be used as the scrubbers shown in FIG. 2. In this embodiment, a wet scrubber system 300 is used to contact the vapor dominated multi-phase process waste stream 302 that exits an electrostatic precipitator as described in connection with FIG. 2 comprising an odorous, noxious, hazardous, toxic, mutagenic, and/or carcinogenic compounds and/or precursor compounds in the vapor dominated multi-phase process waste stream with a scrubbing solution 304 comprising an aqueous solution of hydrogen peroxide and, optionally, at least one additive that catalyzes the decomposition of the hydrogen peroxide to oxidize and remove or reduce the concentration of one or more odorous, noxious, hazardous, toxic, mutagenic, and/or carcinogenic compounds and/or precursor compounds in the vapor dominated multi-phase process waste stream 302 or to at least reduce the concentration, mass, and volume of the odorous, noxious, hazardous, toxic, mutagenic, and/or carcinogenic compounds and/or precursor compounds in the vapor dominated multi-phase process waste stream 302. It should be appreciated that this wet scrubbing system 300 may be used to remove more than one odorous, noxious, hazardous, toxic, mutagenic, and/or carcinogenic compounds and/or precursor compounds in the vapor dominated multi-phase process waste stream 302.

In this embodiment, the vapor dominated multi-phase process waste stream 302 (as represented by the arrows) comprising at least one or more odorous, noxious, hazardous, toxic, mutagenic, and/or carcinogenic compounds and/or precursor compounds in the vapor dominated multi-phase process waste stream enters a wet scrubber 306. In this embodiment, the wet scrubber 306 comprises packing 308, although it should be appreciated that any type of gas/liquid contactor other than a packed bed may be used, including a spray tower with or without packing or a spray venturi. The vapor dominated multi-phase process waste stream 302 enters the wet scrubber 306 and passes through the packing 308 and through a stack or outlet duct 310 where the vapor dominated multi-phase process waste stream 302 is discharged to breathing spaces and/or the atmosphere.

The wet scrubber 306 comprises a sump 312 that holds the scrubbing solution 304. In some embodiments, the sump 312 is integral to the scrubber 306; however, the sump 312 may also be separate from the scrubber 306. The scrubbing solution 304 is pumped by a pump 314 from the sump 312 through a recycle line 316 to a bank of spray nozzles 318 where is it discharged onto the packing 308. It should be appreciated that a wide variety of pumps may be used. The pump should be chosen to provide sufficient power to move fluid at the mass flow rate required by the particular scrubber relative to the gas flow rate and the concentration, mass and volume of the various vapor dominated multi-phase process waste stream compounds to be removed. It should also resist chemical attach by the scrubbing solution 304 and any additives present in the scrubbing solution 304. For certain applications, it may be desirable to use specific types of pumps. For example, when using the pump to introduce ozone or other gaseous hydrogen peroxide decomposition additives or catalysts as described further below, a pump capable of introducing a gas such as ozone into a liquid stream could be used, such as a regenerative turbine pump. It should also be appreciated that the scrubbing solution 304 can be discharged onto the packing in any manner known in the art.

Once discharged onto the packing 308, the scrubbing solution 304 flows in a counter-current and/or cross flow fashion to the direction of the vapor dominated multi-phase process waste stream 302. The packing 308 acts to facilitate contact between the vapor dominated multi-phase process waste stream 302 and the scrubbing solution 304 to allow for the absorption of one or more odorous, noxious, hazardous, toxic, mutagenic, and/or carcinogenic compounds and/or precursor compounds in the vapor dominated multi-phase process waste stream 302 into the scrubbing solution 304. Accordingly, the vapor dominated multi-phase process waste stream 302 that exits through the stack or outlet duct 310 has a reduced concentration, mass and volume of the odorous, noxious, hazardous, toxic, mutagenic, and/or carcinogenic compounds and/or precursor compounds vapor dominated multi-phase process waste stream.

After passing through the packing 308, the scrubbing solution 304 is collected in the sump 312 and recycled back to the top of the packing 308 through a recycle line 316. The sump 312 also has a discharge line 320 that allows either the entire scrubbing solution 304, or a portion thereof, to be discharged, for example, to a wastewater treatment system (not shown). One of skill in the art will appreciate that water may be added to the sump 312 depending upon the amount of scrubbing solution 304 discharged to maintain the water balance in the process and to maintain a desired level in the sump 312.

The scrubbing solution 304 comprises hydrogen peroxide and, optionally, at least one additive that catalyzes the decomposition of at least a portion of the hydrogen peroxide to hydroxyl radicals. In one embodiment, the additive that catalyzes the decomposition of hydrogen peroxide is used to produce hydroxyl free radicals such that the scrubbing solution 304 has a relatively high concentration of hydroxyl radicals upon discharge from the spray nozzles 318 compared to a hydrogen peroxide solution without a hydrogen peroxide decomposition additive.

In the scrubber 306, and particularly in the packing 308, the vapor dominated multi-phase process waste stream 302 and the scrubbing solution 304 comprising hydroxyl free radicals contact each other. During this contact, one or more odorous, noxious, hazardous, toxic, mutagenic, and/or carcinogenic compounds and/or precursor compounds in the vapor dominated multi-phase process waste stream 302 are absorbed or condensed by the scrubbing solution 304 and are oxidized. The oxidation of these components enhances the absorption capacity of the scrubbing solution 304 to allow additional odorous, noxious, hazardous, toxic, mutagenic, and/or carcinogenic compounds and/or precursor compounds in the vapor dominated multi-phase process waste stream to be absorbed. Depending upon the magnitude of the oxidation of the odorous, noxious, hazardous, toxic, mutagenic, and/or carcinogenic compounds and/or precursor compounds in the vapor dominated multi-phase process waste streams, the scrubbing solution 304 may contain byproducts from the oxidation reactions that are soluble in the scrubbing solution 304 or that may adsorb onto semicolloidal particles formed in the scrubbing solution 304 as described further below.

It should be appreciated that at the start of the process the contents of the sump 312 may be essentially makeup water until the process has completed several cycles in which the scrubbing solution 304 has been contacted the vapor dominated multi-phase process waste stream 302 to reach steady-state. However, during steady-state operation, various components are added to the scrubbing solution to maintain its absorption capacity. Specifically, as the scrubbing solution 104 is pumped from the sump 312 to the spray nozzles 318, various chemical components can be added to the scrubbing solution 304.

Aqueous hydrogen peroxide and any other additives can be added to the scrubbing solution 304 in the recycle line 316. The hydrogen peroxide 322 can be delivered from a source container 324 through a feed line 326 into the recycle line 316 using a pump 328. It should be appreciated that the hydrogen peroxide 322 is added upstream of the recycle pump 314, although, as discussed below, the hydrogen peroxide 322 may be added downstream of the recycle pump 314. In some embodiments in which the hydrogen peroxide is added downstream of the recycle pump 314, any hydrogen peroxide decomposition additive may be added downstream of the point where the hydrogen peroxide 322 is added. Although it should be appreciated that the hydrogen peroxide decomposition additive can be added upstream or downstream of the point where the hydrogen peroxide 322 is added.

The concentration of hydrogen peroxide 322 in the source container 324 should be chosen to allow safe handling given the equipment in use and to provide sufficient concentration for the needs of the wet scrubbing system 300. Although the concentration of hydrogen peroxide 322 in the source container 324 may be selected within a wide range, specific embodiments will range between about 35% to about 50% by weight in an aqueous solution, as these ranges are currently industrially available and legally transportable. In a preferred embodiment, the concentration is about 50% by weight in aqueous solution. In other embodiments, the concentration is about 70% by weight in aqueous solution.

The hydrogen peroxide decomposition additive 330, or a mixture of multiple hydrogen peroxide decomposition additives, is delivered from a source container 332 through a feed line 334 into the recycle line 316 using a pump 336. Upon the addition of the hydrogen peroxide decomposition additive 330 to the recycle line 316 and its inherent mixing with the scrubbing solution 304 in the recycle line 316, the decomposition of at least a portion of the hydrogen peroxide to hydroxyl radicals is catalyzed and occurs within the recycle line 316. The scrubbing solution 304 comprising the hydroxyl radicals is then delivered to the scrubber 306 and the packing 308 through the spray nozzles 318. In one embodiment, the hydrogen peroxide decomposition additive produces predominantly hydroxyl radicals; however, it is not necessary that all of the hydrogen peroxide decompose to hydroxyl radicals or that the decomposition itself only produce hydroxyl radicals. Depending upon the amount of hydroxyl radicals produced, which can be determined based upon the removal efficiency of the odorous, noxious, hazardous, toxic, mutagenic, and/or carcinogenic compounds and/or precursor compounds from the vapor dominated multi-phase process waste stream 302, the rate and amount of hydrogen peroxide decomposition additive delivered to the recycle line 316 can be adjusted.

Since the decomposition of at least a portion of the hydrogen peroxide to hydroxyl radicals occurs upon the addition of the hydrogen peroxide decomposition additive 330 to the scrubbing solution 304, it is preferable to add the hydrogen peroxide decomposition additive 330 downstream of the recycle pump 314. This reduces wear on the recycle pump 314 caused by the decomposition product of hydrogen peroxide, e.g., the hydroxyl radicals. However, it should be appreciated that the hydrogen peroxide decomposition additive 330 may be added upstream of the recycle pump 314.

In some embodiments, the hydrogen peroxide decomposition additive is a catalyst that catalyzes the decomposition of hydrogen peroxide to hydroxyl free radicals. Generally, the catalyst is selected relative to the gas stream being treated and the specific gaseous components to be removed so as to generate an aqueous hydrogen peroxide composition having an optimal concentration of hydroxyl free radicals. The catalyst is also selected with a view toward safety and effectiveness. The concentration of the catalyst used will vary depending upon the particular catalyst chosen. Typically, the catalyst will be delivered using an aqueous solution as described above, although for some catalysts, such as ozone and certain of the group VII elements (discussed further below), a direct gaseous addition will be necessary.

In one embodiment, the hydrogen peroxide decomposition additive used is ferrous sulfate. In aqueous media, ferrous ion decomposes hydrogen peroxide in the following manner:

$$Fe^{2+} + H_2O_2 \longrightarrow Fe^{3+} + OH^- + OH^*$$

It should be appreciated that the solubility limit of the catalyst presents an upper bound on concentration of the catalyst in the source container 332. In the case of ferrous sulfate, the concentration may be selected within a wide range with specific embodiments within the range between about 20% to about 38% by weight in aqueous solution. In a preferred embodiment the concentration of ferrous sulfate is about 38% by weight in aqueous solution. In this embodiment, the aqueous hydrogen peroxide composition may be added as a 50% by weight hydrogen peroxide solution in its source container.

The ratio by weight of the hydrogen peroxide solution to the ferrous sulfate, based on a 50% by weight hydrogen peroxide solution and a 38% by weight ferrous sulfate solution should be within the range between about 1:1 to about 100:1, within the range between about 2:1 to about 50:1, or within the range between about 5:1 to about 15:1. The higher the ferrous sulfate ratio the more the decomposition reaction is driven to producing hydroxyl free radicals. The ratio can be as high as one part 50% by weight hydrogen peroxide solution to ten parts 38% ferrous sulfate solution, but in this case an extreme amount of heat is generated. While this amount of heat may be acceptable in some settings, it may not be desirable in others.

It should be appreciated that the use of highly electronegative hydroxyl radicals is capable of a much greater decomposition of odor-causing molecules than any composition known in the art. Further, the use of some of the hydrogen peroxide decomposition additives, particularly, ferrous sulfate, not only reduces the hydrogen peroxide to hydroxyl radicals but also introduces a semi-colloidal substrate into the aqueous media that is capable of effectively adsorbing odorous, noxious, hazardous, toxic, mutagenic, and/or carcinogenic compounds and/or precursor compounds in the vapor dominated multi-phase process waste streams.

Other additives that act as catalysts, other than ferrous sulfate, may be used alone or in combination with ferrous sulfate. In one embodiment, the catalytic additive may be any element chosen from elements in groups 3B, 4B, 5B, 6B, 7B, 8B, 1B, and 2B of the Periodic Table of Elements and may include combinations thereof. It will be readily apparent to one of skill in the art that the additive(s) selected from these elements would be chosen based upon cost, speed of reaction or catalytic effectiveness, and environmental impact. Among these elements, iron and its conjugates are the cheapest, most readily available, and of the lowest environmental impact.

The "d" block transition elements, characterized by the "d" electrons in their valence shell, and combinations thereof, may also be used. For example, the additive may be cobalt. In one embodiment, the aqueous hydrogen peroxide composition may be formed using an amount of cobalt within the range between about 0.5% wt/wt % to about 1% wt/wt % of the total aqueous hydrogen peroxide composition. Or, the amount of cobalt may be between about 0.5% wt/wt % to about 1% wt/wt % of a solution comprised of cobalt and a 50% by weight hydrogen peroxide solution. In another embodiment, the additive may be any element selected from elements in Group 7A of the Periodic Table of Elements and combinations thereof, for example, fluorine.

In one embodiment, the hydrogen peroxide decomposition additive may be ozone. Using ozone as the additive to catalyze the decomposition of the hydrogen peroxide provides numerous advantages. In particular, using ozone allows for operation at higher pH because the ozone is not as solubility limited at higher pH compared to the hydrogen peroxide decomposition additives that comprise metals. As discussed below, the solubility of a metal-based decomposition additive typically decreases at higher pH, but a chelating agent may be used to enhance its solubility. The use of ozone, however, may displace the need to use a chelating agent in combination with a metal-based decomposition, thereby allowing operation at higher pH. As noted above, operation at higher pH provides the scrubbing solution with a greater capacity to absorb acidic odorous, noxious, hazardous, toxic, mutagenic, and/or carcinogenic compounds and/or precursor compounds in the vapor dominated multi-phase process waste stream to be treated, thereby increasing the removal efficiency of the process. Accordingly, when using ozone, because solubility of a metal-based catalytic additive is not an issue, the pH of the scrubbing solution may be increased. The particular pH used in operation can be determined based upon factors such as the type and concentration, mass and volume of the odorous, noxious, hazardous, toxic, mutagenic, and/or carcinogenic compounds and/or precursor compounds in the vapor dominated multi-phase process waste stream and the operating conditions of the scrubber, such as gas rate and the flow rate of the scrubbing solution. Generally, it should be appreciated that virtually any pH above, for example, 5.0, may be used.

When using ozone very poor gas transfer to liquid media has been observed in the art. As part of the present invention, use of a regenerative turbine pump, for example, a Burks regenerative turbine pump manufactured by Burks Manufacturing, can be used as the recycle pump to provide sufficient to excellent mixing of the ozone with the scrubbing solution in the recycle line. Referring back to FIG. 1, such a regenerative turbine pump can be used as the recycle pump 314 in the recycle line 316. In this case, the hydrogen peroxide is added as shown in FIG. 1 upstream of, or on the vacuum side, of the regenerative turbine pump. An ozone/air mixture can then be added to an inlet port pre-built on the vacuum side of the regenerative turbine pump. The resulting liquid discharged from the regenerative turbine pump provides a well-mixed stream. In particular, pressurizing the discharge side of the pump to a minimum of 100 psi by using a pinch valve (not shown) gives sufficient gas transfer of the ozone to the liquid media in the recycle line. It will be appreciated that this pinch valve may be controlled using the same control system that regulates the addition of the other additives shown in FIG. 1. It should be appreciated that in some embodiments, the ozone may be added upstream or downstream or in a separate slipstream of the recycle pump or in any other manner to maximize the transfer of the ozone into the liquid phase and the decomposition of the hydrogen peroxide.

More particularly, as the scrubbing solution, enriched with hydrogen peroxide (due to the addition of hydrogen peroxide from the hydrogen peroxide source container 324), enters the vacuum side of the regenerative turbine pump, the air/ozone mixture is introduced through a pre-machined air port. Intense shear is developed inside the regenerative turbine pump that breaks the ozone/air mixture into microbubbles entrained in the scrubbing solution. The discharge from the regenerative turbine pump is pressurized to approximately 100 psi through a pinch valve assembly, ensuring solubilization of the ozone into the scrubbing solution enriched with hydrogen peroxide, but noting that lower pressures may be used. This allows for the efficient decomposition of the hydrogen peroxide by the ozone into hydroxyl radicals.

The system and process of the embodiment of FIG. 1 may also include a pH control loop to measure the pH of the scrubbing solution 304 in the recycle line 316 and, in response, to regulate the addition of an acid or base 338 into the recycle line 316 to maintain the pH of the scrubbing solution 304 within a preferred pH range or at a specific pH. In such an embodiment, a sidestream 340 of scrubbing solution 304 is taken from the recycle line 316 and passed by a pH probe 342 and then returned to the scrubber 306. The pH probe 342 measures the pH of this sidestream 340 and communicates the measured pH to a pH controller 344. The pH controller 344 then regulates, as needed, the addition of an acid or base 338 from an acid or base source container 346 into the recycle line 316 through feed line 348 using a pump 350. In one embodiment, the acid or base 338 is added upstream of the recycle pump 314. However, it may also be added to the sidestream 340 or downstream of the recycle pump 314. In another embodiment, the acid or base 338 can be added directly to the sump 312.

Through the addition of acid or base using the pH control loop, the pH of the scrubbing solution 304 in the recycle line 316 can be maintained at a level that maximizes the decomposition of the hydrogen peroxide by the hydrogen peroxide decomposition additive that catalyzes such decomposition and that provides for the greatest absorption capacity of the scrubbing solution (e.g., maintaining a given pH in the scrubbing solution that provides the highest level of solubility for one or more odorous, noxious, hazardous, toxic, mutagenic, and/or carcinogenic compounds and/or precursor compounds in the vapor dominated multi-phase process waste stream in the scrubbing solution). This, in turn, allows the removal of the odorous, noxious, hazardous, toxic, mutagenic, and/or carcinogenic compounds and/or precursor compounds from the vapor dominated multi-phase process waste stream to be optimized. One of skill in the art will appreciate that the optimal pH to be used will be dependent upon the particular gaseous components to be removed and oxidized and their respective properties and concentration, mass and volume in the vapor dominated multi-phase process waste stream 302, as well as the composition of the scrubbing solution 304 and operating conditions of the scrubber 306, such as the gas and scrubbing solution flow rates. For example, in removing hydrogen sulfide, its solubility is pH dependent and increases with increasing pH above about pH 5 to about pH 9.5. Accordingly, this solubility property needs to be taken into account in selecting an operating pH of the scrubbing solution when removing hydrogen sulfide. Additionally, the solubility of the decomposition additive, particularly a metal-based additive (discussed below), relative to the pH of the scrubbing solution needs to be taken into account. Typically, metal-based additives are less soluble at higher pH, so that the pH may need to be controlled at a lower level to maintain an adequate concentration of such an additive in solution to catalyze the decomposition of the hydrogen peroxide.

As noted above, in some embodiments, the scrubbing solution 304 may include additional additives, including wetting agents, dispersant polymers, and/or chelating agents (discussed further below). Addition of these additives would be made similar to the addition of the additive for catalyzing the decomposition of the hydrogen peroxide discussed above. Thus, there may be separate source containers to enable the regulated delivery of these additional additives in aqueous form to the recycle line 316. Preferably, these additional additives are added on the downstream side of the recycle pump 314; however, these additives could be added at other locations, including, for example, anywhere along the recycle line 316 or directly to the sump 312. Additionally, some or all of these other additives may be mixed together and delivered from a single source container. Alternatively, any one or more of these additives may be provided together with one or more other additives. For example, the hydrogen peroxide in its source container 324 may contain any one or more chemically compatible (e.g., resistant to oxidation) additives such as certain chelating agents and/or wetting agents. Of course, the additives may also be provided with the hydrogen peroxide decomposition additive 330 from its source container 332 and/or from a source container 350 containing acid or base 338.

In one embodiment, a nonionic wetting agent may be added to the scrubber or to the scrubbing solution to enhance its activity by allowing further penetration of the oxidizing agent into crevices of bacterial forms of odorous, noxious, hazardous, toxic, mutagenic, and/or carcinogenic compounds and/or precursor compounds. While the exact mechanism is not known, it is believed that certain nonionic surfactants, i.e., wetting agents, assist in the degradation of bacterial cell walls allowing the scrubbing solution to more readily kill the bacteria in the medium.

Preferred wetting agents are octylphenols, ethylene oxide block copolymers, propylene oxide block copolymers, and combinations thereof. The determining factors for wetting agent choice is organic loading of the effluent, i.e., the level of proteins or starches in the effluent, cleanliness of the system being treated, i.e., the amount of deposits and slime on the surfaces of the scrubber tank or sump and packing, as well as need for defoaming capabilities. In one embodiment, the wetting agent, as 100% active material, is present in an amount up to about 10% by weight of the scrubbing solution (in the scrubber or as additives to the recycle line), an amount up to about 5% by weight of the scrubbing solution, or an amount up to about 1% by weight of the scrubbing solution.

In another embodiment, a low molecular weight dispersant polymer may be added to the scrubber or to the scrubbing solution in order to prevent iron and other particle agglomeration in the aqueous media as well as to prevent iron and organic deposition in lower liquid flow areas. In one embodiment, the average molecular weight of these low molecular weight dispersants is within the range between about 1,000 to about 22,000 or within the range between about 1,000 to about 9,000. These low molecular weight dispersants may be, but are not limited to, homopolymers of acrylic acid, methacrylic acid, acrylamide, copolymers and terpolymers acrylates, methacrylates, acrylamide, AMPS (2-acrylamido-2-methyl propane sulfonic acid), and combinations thereof. For example, a dispersant resistant to oxidation may be desirable in situations where sulfur-based compounds that are formed as a result of operation at a higher pH and interaction with a metal-based decomposition additive in which insoluble agglomerations, such as zinc sulfate, are formed.

The low molecular weight dispersant polymer is added on a weight percent basis (i.e., wt/wt % of the total composition weight of the aqueous hydrogen peroxide composition in the scrubber or as additives to a scrubber sidestream). In one embodiment, the percentage of the low molecular weight dispersant in the scrubbing solution is within the range between about 0.5% active wt/wt % to about 10% active wt/wt % of the total scrubbing solution, within the range between about 0.5% active wt/wt % to about 5% active wt/wt % of the total scrubbing solution, or within the range between about 0.5% active wt/wt % to about 2% active wt/wt % of the total scrubbing solution.

In another embodiment, a chelating agent may be added to the scrubbing solution. As earlier discussed, a semi-colloidal metal complex may form during the oxidation process, and in some instances, the development of this colloidal metal complex is undesirable. A chelating agent may be added to prevent the formation of metal hydroxides or other insoluble metal complexes. In one embodiment, the chelating agents may be organic acids such as gluconic acids, citric acids, glycolic acids, lactic acids, and combinations thereof. It will be appreciated that a large number of chelating agents may also be used and their selection apparent to those of skill in the art; however, the chelating agent should not be of such potent chelating ability as to prevent the availability of the metal complex for decomposition purposes.

A chelating agent may also be added to enhance the solubility of the hydrogen peroxide decomposition additive or catalyst. This may, in some embodiments, allow for operation at higher pH. As noted above, higher pH increases removal of the odorous, noxious, hazardous, toxic, mutagenic, and/or carcinogenic compounds and/or precursor compounds in the vapor dominated multi-phase process waste stream compared to lower pH operation. It should be appreciated, however, that a chelating agent may be used to enhance the solubility of the hydrogen peroxide decomposition additive in some embodiments where increasing the pH may not be necessary.

Generally, chelating agents can be selected based upon the particular hydrogen peroxide decomposition additive being used. For example, chelating agents known in the art may be used to increase the solubility of metal-based hydrogen peroxide decomposition additives, such as ferrous ion and other metal complexes. In addition, ferric ($Fe^{3+}$) ion may be used as the hydrogen peroxide decomposition additive to decompose hydrogen peroxide to hydroxyl radicals, and chelating agents may be added to increase the solubility of the ferric ion, thereby increasing the production of hydroxyl free radicals and allowing for operation at a higher pH. Chemical Treatment of Pesticide Wastes—Evaluation of Fe(III) Chelates for Catalytic Hydrogen Peroxide Oxidation of 2,4-D at Circumneutral pH, Sun et al., J. Agric. Food Chem., 1992, 40, 322-327, which is incorporated by reference herein in its entirety, describes several chelating agents that may be used to solubilize ferric ion. Such chelating agents that showed "high" catalytic activity and that may be used in the present invention include: aminopolycarboxylates, such as nitrilotriacetic acid and hydroxyethyliminodiacetic acid; N-heteroxcyclic carboxylates, such as picolinic acid; polyhydroxy aromatics, such as gallic acid; and other compounds, such as rhodizonic acid, tetrahydroxy-1,4-quinone, and hexaketocyclohexane. These chelating agents may be used separately; however, it may be possible to use mixtures of these chelating agents as well. In other embodiments, the chelating agent comprises methylglycinediacetate or trisodium methylglycinediacetate (available as TRILON M from BASF Corporation, believed to have been developed as an environmentally friendly alternative to nitrilotriacetic acid or "NTA") or methylglycinediacetic acid.

It should be appreciated that the chelating agent and the hydrogen peroxide decomposition additive, such as ferrous ion or ferric ion (which may be added, for example, as ferric sulfate) may be mixed before use to allow for chelation. For example, referring to FIG. 1, the chelating agent and the ferric ion may be chelated prior to placing such a mixture in the source container 332 for the hydrogen peroxide decomposition additive. In this case, the selection of the hydrogen peroxide decomposition additive and chelating agent can be based upon the specific application or particular gaseous components to be removed and the desired operating pH. By mixing the hydrogen peroxide decomposition additive and the chelating agent prior to use, this mixture is essentially "tailor-made" and is ready for immediate use in the particular application at issue. In fact, this mixture can be prepared remote from the facility where it will be used and shipped to that facility for immediate use. In some embodiments, methylglycinediacetate or trisodium methylglycinediacetate can be mixed with a source of ferric ion, such as a ferric salt solution, to produce a ferric chelate, ferric methylglycinediacetate, as described in U.S. Pat. No. 6,960,330 to Cox, which is incorporated herein by reference in its entirety.

Alternatively, the hydrogen peroxide decomposition additive and the chelating agent may be added separately to the hydrogen peroxide decomposition additive source container 332, thereby allowing for in-situ chelation in the source container 332. In this case, consideration must be given to the rate at which this solution is added to the recycle line 316 to provide sufficient time for chelation to occur. One of skill in the art will appreciate the conditions necessary to chelate, including use of the proper pH, which may be in some embodiments, for example, pH 6. Alternatively still, the chelating agent may be added through the use of a separate source container (not shown) in a manner similar to that of the hydrogen peroxide decomposition additive source container 332. Further, the use of a separate source container for the chelating agent may be used to dispense the chelating agent into the recycle line 316 either upstream or downstream of the recycle pump 314; however, it is preferable to dispense the chelating agent into the recycle line 316 as closely as possible to the point where the decomposition additive is added to the recycle line 316.

As noted above, use of a chelating agent to increase the solubility of the hydrogen peroxide decomposition additive (for example, metal-based additives and, in particular, ferrous or ferric ions) allows for operation at a higher pH in the scrubbing solution that is fed to the scrubber. Operation at higher pH increases the capacity of the scrubbing solution to absorb additional acidic gases, thereby increasing the removal efficiency of the process. It should be appreciated that the specific pH used will be dependent upon the particular gaseous components to be removed from the gas stream and, correspondingly, may include a wide range of pHs. In some embodiments, it may be desirable to not change the operating pH significantly or at all upon the addition of a chelating agent.

The system and process of the embodiment of FIG. 1 may also include a source container 352 to deliver other additives, such as a biocide 354 into the scrubber 306. In one embodiment, the additional additive 354 is added to the scrubber 306 through a feed line 356 to the recycle line 316 using a pump 358. In this case, the additional additive 354 may be added upstream or downstream of the recycle pump 314. In either case, the additional additive 354 will enter the scrubber 306 with the scrubbing solution 304. The additional additive 354 can be added continuously or semi-continuously or a designated intervals as necessary. In another embodiment, the additional additive 354 can be added batch-wise to shock-treat the system.

According to another embodiment, the additional additive 354 may be combined with the aqueous hydrogen peroxide 322 in its source container 324 and added to the recycle line 316 with the hydrogen peroxide 322. In yet another embodiment, the additional additive 354 may be combined with the acid or base 338 in its source container 350 and added to the recycle line 316 with the acid or base 338. In another embodiment, the additional additive 354 may be combined with the decomposition additive 330 in its source container 332 and added to the recycle line 316 with the hydrogen peroxide decomposition additive 330. The additional additive 354 may also be added directly to the sump 312.

In some embodiments in which the additional additive 354 is a biocide, such may be added in the various methods described above as an aqueous solution. In other embodiments, a tablet form of a biocide, such as bromide, is used and can be added directly to the sump 312. It should be appreciated that in those embodiments in which the biocide is combined with another material before being added to the recycle line 316 the biocide may be added directly to the respective source container of the other material or added to its own source container 352 and from there added through its feed line 356 to the appropriate other source container through separate feed lines 360, 362, 364. Other aspects regarding the use of a biocide are described in U.S. Patent Application Publication No. US 2012/0087827, entitled "Method and Apparatus for Treating Industrial Gas Streams and Biological Fouling," which is incorporated by reference herein in its entirety.

As described above, a biocide is added to the scrubber 306 to treat biofouling that may occur in the scrubber 306, particularly in the packing 308 or in the sump 312. According to one embodiment, the amount of biocide added is the amount necessary to maintain a residual concentration in the scrubbing solution 304. Depending upon the biocide used, manufacturer's recommendations for the amount of biocide necessary may also be used. Further, certain operating parameters can be measured to determine whether the amount of biocide added or the concentration of biocide needs to be altered. For example, one technique for determining whether an accumulation of biofouling exists in the scrubber 306 is by monitoring the gas pressure differential across the packing 308. A drop in the gas pressure across the packing 308, or an increase in the gas differential, may be used to indicate an increase in biofouling in the packing 308. In this case, additional biocide may be added or the residual biocide concentration may be increased.

Generally, any biocide may be used. In one embodiment, the biocide is quaternary ammonium. In some embodiments, the residual concentration of quaternary ammonium in the scrubbing solution is about 6 to about 7 parts per billion (ppb). In another embodiment, the biocide is not an oxidizer. Such non-oxidizers include dibromo nitrilopropionamide (DBNPA), 2,2 dibromo-3-nitrilopropionamide, gluteraldehyde, a carbamate, mercaptobenzothiazole (MBT), or isothiazolinone. In some embodiments, the biocide is a mixture of alkyl dimethylbenzylammonium chloride and alkyl dimethylethylbenzyl-ammonium chloride, including, in some embodiments, a mixture of these two compounds at 25% by weight.

It should be appreciated that the addition rates of any of the foregoing materials to the recycle line 316, the sump 312, or to the scrubbing solution 304 in general can be regulated to achieve the desired feed rate and concentration in the scrubbing solution 304 by any means known in the art, such as control valves, flow meters, or variable speed pumps. Further, the equipment for feeding these components may by stand-alone or independent or be incorporated as part of a larger control system, particularly in the case where the system includes more than one scrubber. It will be appreciated that other embodiments may be utilized in which the components of the scrubbing solution 304 are added at different locations within the system, including different locations along the recycle line 316 or directly to the sump 312.

One of skill in the art will appreciate that the actual composition of the scrubbing solution in the recycle line and, specifically, the concentration of hydrogen peroxide, the decomposition additive, and hydroxyl free radicals therein, is determined based upon the composition of the gas stream entering the scrubber and the specific gaseous components to be removed, as well as the scrubber operating conditions. At a given set of scrubber operating conditions (such as the gas flow rate and concentration, mass and volume of odorous, noxious, hazardous, toxic, mutagenic, and/or carcinogenic compounds and/or precursor compounds and the scrubbing solution flow rate through the scrubber), the addition rate of either or both of the hydrogen peroxide and the decomposition additive may be adjusted to provide the necessary production of hydroxyl free radicals to achieve the desired removal rate of odorous, noxious, hazardous, toxic, mutagenic, and/or carcinogenic compounds and/or precursor compounds. Of course, the concentration of the hydrogen peroxide and the decomposition additive in their respective source containers may be adjusted to achieve the desired rate of addition of each to the system taking into account overall water balance considerations.

The various embodiments described above have been primarily with reference to removal of odorous, noxious, hazardous, toxic, mutagenic, and/or carcinogenic compounds and/or precursor compounds vapor dominated multiphase process waste stream compounds from a gas stream in which the odorous, noxious, hazardous, toxic, mutagenic, and/or carcinogenic compounds and/or precursor compounds are absorbed, condensed and oxidized during contact with a scrubbing solution comprising hydrogen peroxide and hydroxyl radicals to produce a substantially non-odor offensive, environmentally acceptable byproduct. It should be appreciated, however, that various oxidizers or solutions containing oxidizers may be used. For example, oxidizing compounds such as chlorine gas, sodium hypochlorite, hypobromous acid, chlorine dioxide, hydrogen peroxide, peroxy acids, ozone, and permanganate may be used alone or in combination.

In addition, various embodiments have been described above in the context of the use of a wet scrubber system using a single packed column with a single integrated sump. It should be appreciated that other gas/liquid contactors may be used in the wet scrubber system. For example, spray towers, venturi spray condensers, or a combination of spray towers and packed columns may be used. Further, counter-current scrubbers, where the direction of the gas flow is opposite the direction of the liquid flow; co-current scrubbers, where the direction of the gas flow is in the same direction as the liquid flow; and cross-flow scrubbers, where the direction of the gas flow is at an angle to the direction of the liquid flow; may be used. In addition, it should be appreciated that more than one sump may be used for a single scrubber or, alternatively, one sump may be used for more than one scrubber. Further, it should be appreciated that the sump does not necessarily need to be integral to the gas/liquid contactor and may be a separate tank, provided that appropriate gas seals are in place.

It should also be appreciated that more than one gas/liquid contactor may be used in a single system. Such gas/liquid contactors may be of the same or various types and may be configured to operate in series or in parallel. Each gas/liquid contactor could also have its own sump or multiple gas/liquid contactors may share the same sump. In using more than one gas/liquid contactor with one or more sumps, it is possible to utilize one set of source containers for hydrogen peroxide, additives, and any acid or base required for pH control, or separate source containers may be used in connection with a given one or more gas/liquid contactors.

Figure 4:
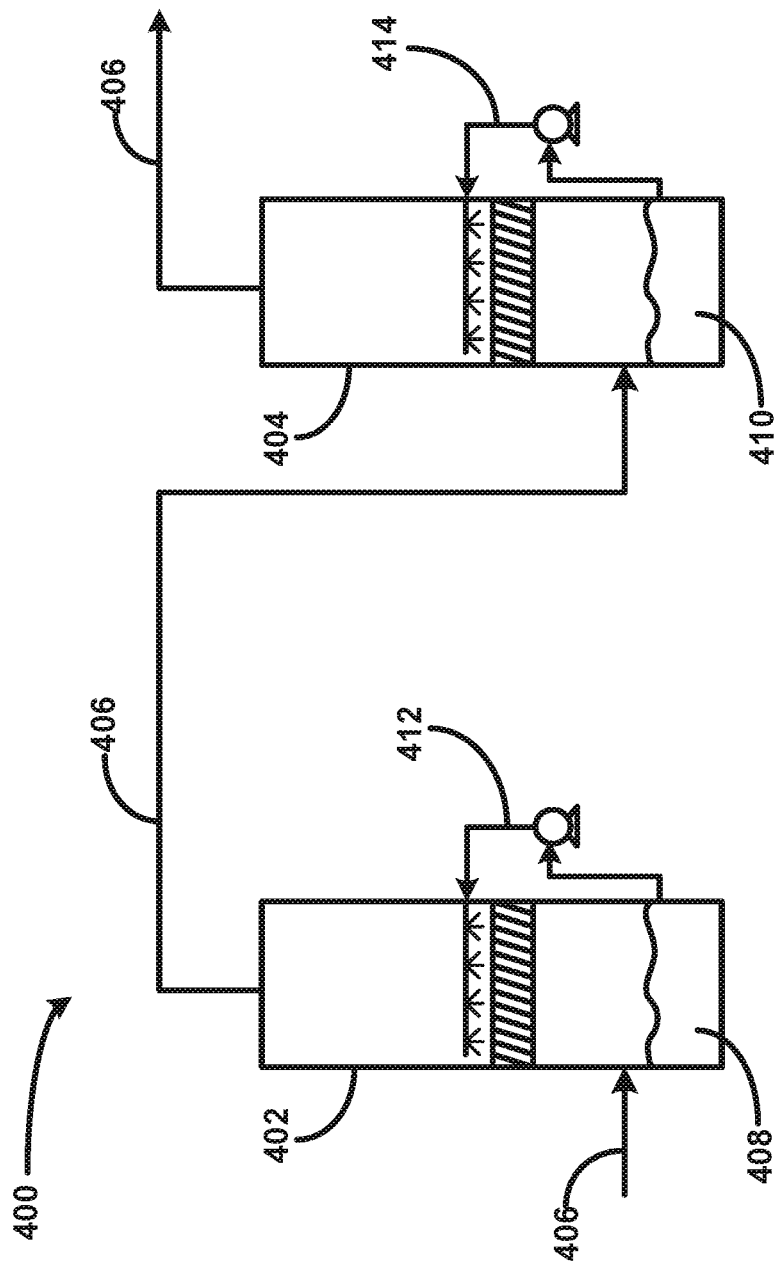
FIG. 4 illustrates a process flow diagram for a series of scrubbers and related process equipment that can be used as the scrubber shown in FIGS. 2, 6, and 8.

FIG. 4 illustrates a process flow diagram for a series of scrubbers and related process equipment that can be used as the scrubber shown in FIG. 2. In this process 400, two gas/liquid contactors 402, 404, shown as packed bed scrubbers, are used in series to remove one or more odorous, noxious, hazardous, toxic, mutagenic, and/or carcinogenic compounds and/or precursor compounds from the vapor dominated multi-phase process waste stream 406. In other embodiments, this scrubber arrangement may contain additional scrubbers. In this embodiment, the gas stream 406 comprising one or more odorous, noxious, hazardous, toxic, mutagenic, and/or carcinogenic compounds and/or precursor compounds in the vapor dominated multi-phase process waste stream enters the first packed bed scrubber 402, where one or more odorous, noxious, hazardous, toxic, mutagenic, and/or carcinogenic compounds and/or precursor compounds are removed from the vapor dominated multi-phase process waste stream 406. Upon exiting the first packed bed scrubber 402, the gas stream 406 is passed to the second packed bed scrubber 404 where one or more odorous, noxious, hazardous, toxic, mutagenic, and/or carcinogenic compounds and/or precursor compounds are removed from the vapor dominated multi-phase process waste stream 406. It should be appreciated that the particular odorous, noxious, hazardous, toxic, mutagenic, and/or carcinogenic compounds and/or precursor compounds in the vapor dominated multi-phase process waste stream removed in each scrubber 402, 404 may be the same or different. For example, it may be possible to remove a portion of a particular odorous, noxious, hazardous, toxic, mutagenic, and/or carcinogenic compounds and/or precursor compounds in the vapor dominated multi-phase process waste stream in the first scrubber 402 and then remove an additional portion of that same odorous, noxious, hazardous, toxic, mutagenic, and/or carcinogenic compounds and/or precursor compounds in the vapor dominated multi-phase process waste stream in the second scrubber 404. Alternatively, it may be possible to remove a portion of a particular odorous, noxious, hazardous, toxic, mutagenic, and/or carcinogenic compounds and/or precursor compounds in the vapor dominated multi-phase process waste stream in the first scrubber 402 and then remove a portion of a different odorous, noxious, hazardous, toxic, mutagenic, and/or carcinogenic compounds and/or precursor compounds in the vapor dominated multi-phase process waste stream in the second scrubber 404. It may also be possible to remove a portion of one particular odorous, noxious, hazardous, toxic, mutagenic, and/or carcinogenic compounds and/or precursor compounds and a second one or more of another particular odorous, noxious, hazardous, toxic, mutagenic, and/or carcinogenic compounds and/or precursor compounds in the vapor dominated multi-phase process waste stream in the first scrubber 402 and then remove an additional portion of one of the same odorous, noxious, hazardous, toxic, mutagenic, and/or carcinogenic compounds and/or precursor compounds in the vapor dominated multi-phase process waste stream compounds in the second scrubber 404 as well as a portion of yet another different odorous, noxious, hazardous, toxic, mutagenic, and/or carcinogenic compounds and/or precursor compounds vapor dominated multi-phase process waste stream compound that may not have been removed in the first scrubber 402.

Each of the packed bed scrubbers 402, 404 are similar to the gas/liquid contactor described in connection with FIG. 3. In addition, each of these packed bed scrubbers 402, 404 may be operated in the same manner as that described in connection with FIG. 3, including with respect to the addition of hydrogen peroxide, a hydrogen peroxide decomposition additive, and other additives. Therefore, the equipment related to the addition of these components to the scrubbing solution in each packed bed scrubber 402, 404 is not shown in FIG. 4. It should be appreciated, however, that although the gas/liquid contactors 402, 404 are shown as packed bed scrubbers, any type of gas/liquid contactor may be substituted for one or both of the packed bed scrubbers 402, 404, such as a spray venturi. Therefore, any combination of gas/liquid contactors may be used. Further, the scrubbing solution used in either scrubber may include any composition of scrubbing solution described above.

In one embodiment, however, the scrubbing solution in one scrubber is controlled at an alkaline pH, and the scrubbing solution in the other scrubber is controlled at an acidic pH. In other embodiments, additional scrubbers controlled at with neutral-range pH may be included. The pH control for each scrubbing solution can be performed in the same manner as described above in connection with FIG. 3. It should be appreciated that the scrubbing solution 408 in the first scrubber 402 may use either an alkaline scrubbing solution or an acidic scrubbing solution with the second scrubber 404 utilizing the opposite scrubbing solution. For example, if an acidic pH scrubbing solution is used in the first scrubber 402, then an alkaline scrubbing solution would be used in the second scrubber 404 and vice versa. It should be appreciated that by utilizing two scrubbers, each with scrubbing solutions at different pHs, different types of odorous, noxious, hazardous, toxic, mutagenic, and/or carcinogenic compounds and/or precursor compounds in the vapor dominated multi-phase process waste stream may be absorbed since not all such compounds can be absorbed at the same pH. Accordingly, a larger fraction of all of the odorous, noxious, hazardous, toxic, mutagenic, and/or carcinogenic compounds and/or precursor compounds in the vapor dominated multi-phase process waste stream can be removed compared to use of a single gas/liquid contactor.

Although either scrubber may utilize an alkaline or acidic scrubbing solution, the following description will be for a process in which the first scrubber 402 utilizes an alkaline scrubbing solution and the second scrubber 404 utilizes an acidic scrubbing solution. Accordingly, the scrubbing solution 408 in the first scrubber 402 is controlled at an alkaline pH. In some embodiments, the pH of the scrubbing solution 408 in the first scrubber 402 is controlled at a pH of a pH 7.0 or greater. In some embodiments, the pH of this scrubbing solution is controlled at a pH of approximately 7.0, 7.5, 8.0, 8.5, 9.0, 9.2, or 9.5 or higher. As noted above, control of the pH can be done as described above in connection with FIG. 3.

The alkaline scrubbing solution 408 comprises hydrogen peroxide that is fed to the recycle line 412 as described above in connection with FIG. 3. In addition, optionally, a hydrogen peroxide additive and/or a chelating agent may be added to the scrubbing solution 408 as well. Therefore, it should be appreciated that the alkaline scrubbing solution may comprise a solution of only hydrogen peroxide; a solution of hydrogen peroxide and a hydrogen peroxide decomposition additive, such as ferrous or ferric ion or any of the other hydrogen peroxide decomposition additives described above, in which case the scrubbing solution will contain the reaction product or products of the decomposition of the hydrogen peroxide; or hydrogen peroxide, a hydrogen peroxide decomposition additive, and a chelating agent as described above. It should be appreciated that any of the methods described above in connection with FIG. 3 may be used for mixing and adding these components to the scrubbing solution 408. Further, additional additives described above in connection with FIG. 3 may also be used in this embodiment, and any of the methods described above in connection with FIG. 3 may be used for mixing and adding these components to the scrubbing solution 408.

The scrubbing solution 410 used in the second gas/liquid contactor 404 is an acidic scrubbing solution and is controlled at an acidic pH. In some embodiments, the pH of this scrubbing solution 410 is controlled at a pH that is less than 7.0, 6.5, 6.0, 5.5, or 5.0 or lower. As noted above, control of the pH can be done as described above in connection with FIG. 3.

The scrubbing solution 410 comprises hydrogen peroxide that is fed to the recycle line 414 as described above in connection with FIG. 3. In addition, optionally, a hydrogen peroxide additive and/or a chelating agent may be added to the scrubbing solution 410 as well. Therefore, it should be appreciated that the acidic scrubbing solution may comprise a solution of only hydrogen peroxide; a solution of hydrogen peroxide and a hydrogen peroxide decomposition additive, such as ferrous or ferric ion or any of the other hydrogen peroxide decomposition additives described above, in which case the scrubbing solution will contain the reaction product or products of the decomposition of the hydrogen peroxide; or hydrogen peroxide, a hydrogen peroxide decomposition additive, and a chelating agent as described above. It should be appreciated that any of the methods described above in connection with FIG. 3 may be used for mixing and adding these components to the scrubbing solution 410. Further, additional additives described above in connection with FIG. 3 may also be used in this embodiment, and any of the methods described above in connection with FIG. 3 may be used for mixing and adding these components to the scrubbing solution 410. Again, it should be appreciated that the first scrubber 402 may utilize an acidic scrubbing solution, as described above, and the second scrubber 404 may utilize an alkaline scrubbing solution as described above.

In one embodiment, the operation of the scrubbers 402, 404 may be reversed temporarily or for a given period of time during which each scrubber 402, 404 uses a scrubbing solution controlled at a pH at which the other scrubber's scrubbing solution was operating. For example, the process 400 shown in Figure may be operated in a manner in which the first scrubber 402 utilizes an alkaline scrubbing solution 408, and the second scrubber 404 utilizes an acidic scrubbing solution 410. After operation in this mode for a given period of time, the operation of the scrubbers 402, 404 is reversed such that the first scrubber 402 utilizes an acidic scrubbing solution 408, and the second scrubber 404 utilizes an alkaline scrubbing solution 410 for another given period of time. After this period of time, the scrubbers 402, 404 may be switched again to utilize a scrubbing solution controlled at the original pH (i.e., the first scrubber 402 would again utilize an alkaline scrubbing solution 408, and the second scrubber 404 would again utilize an acidic scrubbing solution 410).

In one embodiment, the scrubbing solutions may be changed by simply discharging the scrubbing solutions currently being used by each scrubber and starting with fresh or new scrubbing solution now controlled at the pH originally used in the opposite scrubber. It should be appreciated, however, that the operating pH of the respective scrubbing solutions does not necessarily have to be equivalent to that used in the other scrubber prior to switching the operating pH of each scrubbing solution. For example, if the first scrubber was utilizing an alkaline scrubbing solution controlled at pH 9.2 and the second scrubber was utilizing an acidic scrubbing solution controlled at pH 5.0, after starting with new scrubbing solution in each scrubber, such that the first scrubber would be utilizing an acidic scrubbing solution and the second scrubber would be utilizing an alkaline scrubbing solution, the respective new scrubbing solutions in each scrubber do not necessarily have to be controlled at pHs of 9.2 and 5.0 (e.g., the new acidic scrubbing solution in the first scrubber can be controlled at an acidic pH other than 5.0 and the new alkaline scrubbing solution in the second scrubber can be controlled at a alkaline pH other than 9.2). However, in some cases, the pH will be controlled at the same pH originally used in the other scrubber.

It should also be appreciated that the composition of each scrubbing solution does not necessarily have to be the same as the scrubbing solution used in the other scrubber prior to switching the operating pH of each scrubbing solution. For example, if the first scrubber was utilizing a scrubbing solution comprising only hydrogen peroxide and the second scrubber was utilizing a scrubbing solution comprising hydrogen peroxide and a hydrogen peroxide decomposition additive, after starting with new scrubbing solution in each scrubber, the first scrubbing solution could utilize only hydrogen peroxide and is not limited to using hydrogen peroxide and a hydrogen peroxide decomposition additive as was used in the second scrubber prior to switching. However, in some cases, the components used in the respective scrubbing solutions can be the same as used in the other scrubber prior to switching.

It should also be appreciated that the feed lines for the various components added to each scrubbing solution can be piped to allow for feeding to either scrubber. In this manner, the components fed to each scrubbing solution can be easily fed to the opposite scrubber to allow that scrubber to be started with a new scrubbing solution that is now controlled at a different pH. For example, any acids or bases used to control the pH of the scrubbing solutions can be piped to feed to either scrubber recycle line. In this manner, if the first scrubber utilizes an alkaline scrubbing solution to which a base is fed to control the pH at the desired alkaline pH, piping can be used such that the same base can also be fed to the recycle line of the second scrubber such that upon switching the operating pH of the scrubbing solutions, the same base can easily be used to control the pH of the scrubbing solution in the second scrubber at the desired alkaline pH.

This temporary switching of the pH at which each scrubber's scrubbing solution is controlled may provide cleaning benefit for the scrubbers. For example, scale deposits that may have built-up in the first scrubber 402 during operation with an alkaline scrubbing solution may be dissolved and removed during operation with an acidic scrubbing solution. In this case, an acidic scrubbing solution may be used in the first scrubber 402 and an alkaline scrubbing solution may be used in the second scrubber 404 for a given period of time to allow the acidic scrubbing solution to effectively dissolve some or all of the scale deposits in the first scrubber 402. After this period of time, an alkaline scrubbing solution may again be used in the first scrubber 402 and an acidic scrubbing solution may again be used in the second scrubber 404.

It should also be appreciated that the gas stream 306 being fed to the two scrubbers 402, 404 in series may be pretreated before being fed to these scrubbers. For example, the gas stream may be condensed in one or two stages to condense one or more odorous, noxious, hazardous, toxic, mutagenic, and/or carcinogenic compounds and/or precursor compounds in the vapor dominated multi-phase process waste stream. In one embodiment, the gas may be condense in a first stage to a temperature of approximately 40° C. and then further condensed in a second stage to a temperature of approximately 0° C. The gas stream may then be further treated by passing it through a particulate collection device, such as an electrostatic precipitator, to remove any particulate matter from the gas stream.

It should be appreciated, however, that any scrubbing solution that utilizes any of the oxidizing compounds described above may be used in either or both of the scrubbers used in the process 400 shown in FIG. 4. Further, all of the same additives described above in connection with FIG. 3 can be added to the scrubbing solution for either gas/liquid contactor shown in FIG. 4 if appropriate given the pH and composition of the specific scrubbing solution.

Figure 4A:
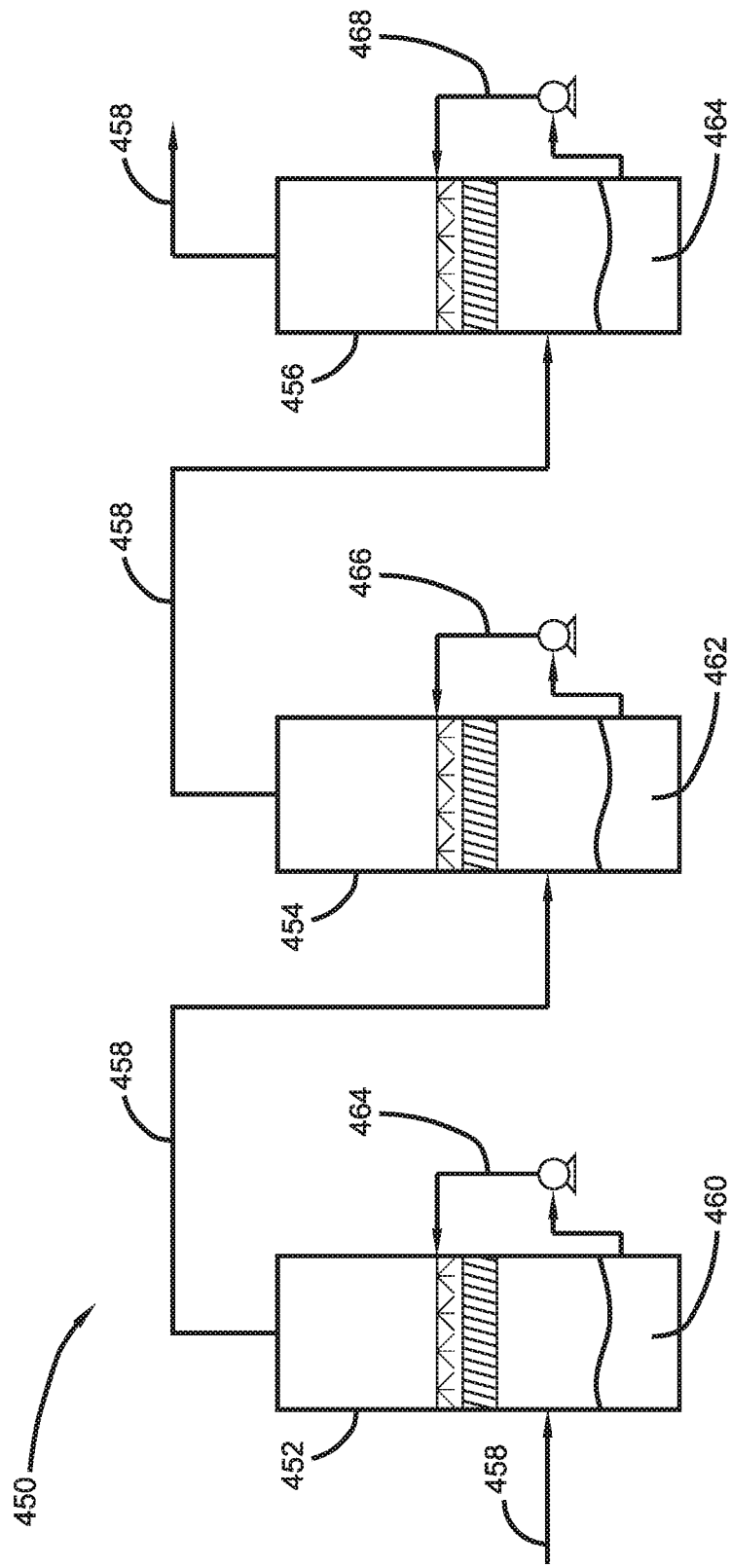
FIG. 4A illustrates a process flow diagram for a series of scrubbers and related process equipment that can be used as the scrubber shown in FIGS. 2, 6, and 8.

FIG. 4A illustrates a process flow diagram for a series of scrubbers and related process equipment that can be used as the scrubber shown in FIG. 2. In this process 450, three gas/liquid contactors 452, 454, 456, shown as packed bed scrubbers, are used in series to remove one or more odorous, noxious, hazardous, toxic, mutagenic, and/or carcinogenic compounds and/or precursor compounds from the vapor dominated multi-phase process waste stream 458. It should be appreciated that each of the scrubbers 452, 454, 456 can be operated as described above in connection with FIGS. 3 and 4. In one embodiment, the first two scrubbers in the series 452, 454 can be operated using alkaline and acidic scrubbing solutions 460, 462, respectively, as described in connection with FIG. 4. In some embodiments, these scrubbing solutions include hydrogen peroxide alone or other oxidizing compounds such as $ClO_2$, bleach, ozone, etc. that is fed to the respective recycle lines 464, 466. In these embodiments, the scrubbing solution 464 used in the third gas/liquid contactor is a neutral-range scrubbing solution. In some embodiments, the pH of this scrubbing solution 464 is less than 9.0 and greater than 5.0. In some embodiments, this scrubbing solution 464 includes hydrogen peroxide alone or other oxidizing compounds such as $ClO_2$, bleach, ozone, etc. that is fed to the recycle line 468 for this third scrubber 456. In some embodiments, this scrubbing solution includes hydrogen peroxide and a hydrogen peroxide decomposition additive that catalyzes the decomposition of the hydrogen peroxide to enhance the effectiveness of the scrubbing solution to absorb the odorous, noxious, hazardous, toxic, mutagenic, and/or carcinogenic compounds and/or precursor compounds vapor dominated multi-phase process waste stream compounds. In this case, the scrubbing solution will contain the reaction product or products or the decomposition of the hydrogen peroxide.

Figure 5:
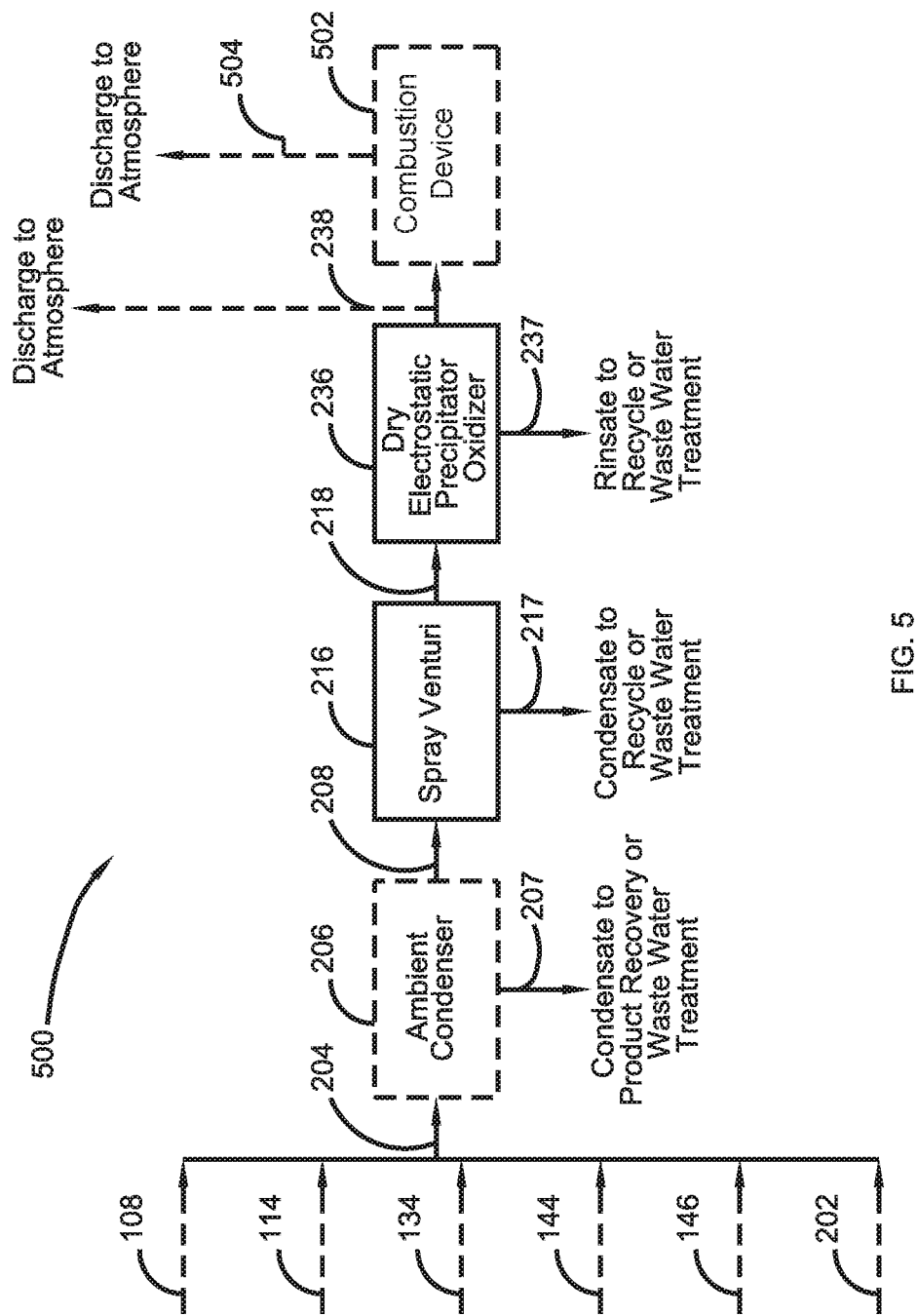
FIG. 5 illustrates a flow diagram of a process for treating one or more vapor dominated process waste discharges having commingled gas, liquid, and/or solid phases containing odorous, noxious, hazardous, toxic, mutagenic, and/or carcinogenic compounds and/or precursor compounds according to one embodiment of the present invention.

FIG. 5 illustrates a flow diagram of a process for treating one or more vapor dominated process waste discharges having commingled gas, liquid, and/or solid phases containing odorous, noxious, hazardous, toxic, mutagenic, and/or carcinogenic compounds and/or precursor compounds according to one embodiment of the present invention. The process 500 shown in FIG. 5 is somewhat similar to that shown in FIG. 2 in that the initial streams that may be treated 108, 114, 134, 144, 146, 202, are the same, as well as the use of the ambient temperature condenser 206, the spray venturi 216 and the dry ESP oxidizer 236. In other words, in this embodiment, the same vapor dominated multi-phase process waste streams that are treated according to the description of FIG. 2 can also be treated in this embodiment. Since the treatment of the vapor dominated multi-phase process waste stream 114 exiting the condenser 112 is of particular interest in this embodiment, the addition of the other streams 108, 134, 144, 146, 202 shown and 114 are presented as dashed lines or as optional. In addition, the ambient temperature condenser (206) is presented as dashed lines or as optional. As noted above, in those processes in which the vapor dominated multi-phase process waste stream 114 exit the condenser 112 is passed directed to a combustion device, such as a steam boilers, TOs, RTOs, RCOs, TROs, for combustion, such vapor dominated multi-phase process waste stream 114 may be treated using any of the various embodiments of the present invention prior to optional discharge to the atmosphere or optionally entering the combustion device to reduce the vapor dominated multi-phase process waste stream mass and volume, minimize resulting air pollution (e.g. water vapor, particulates, $NO_x$, $SO_x$, etc.) and decrease the impact of those vapor dominated multi-phase process waste stream compounds that are detrimental to the combustion device itself, such as vapor dominated multi-phase process waste stream compounds that, for example, corrode, erode or otherwise deteriorate the combustion equipment.

As shown, the vapor dominated multi-phase process waste stream 114 that exits the condenser 112 (FIG. 2) is passed, optionally along with other vapor dominated multi-phase process waste streams, as an inlet stream 204 (FIG. 5) to a gas/solid separator 216, such as a spray venturi scrubber system and its various embodiments, to condense and remove additional volume and gases, liquids, and/or solids comprising odorous, noxious, hazardous, toxic, mutagenic, and/or carcinogenic compounds and/or precursor compounds in the vapor dominated multi-phase process waste stream 114. The gas/solid separator 216 produces a vapor dominated multi-phase process waste stream 218 that has a reduced amount of gas, liquid, and/or solid phases comprising odorous, noxious, hazardous, toxic, mutagenic, and/or carcinogenic compounds and/or precursor compounds. This vapor dominated multi-phase process waste stream 218 is then be passed to a dry ESP oxidizer and its embodiments (e.g. enhanced UV/ozone photo Fenton oxidation, hydrophilic or superhydrophilic collector plate coatings, etc.) 236. This vapor dominated multi-phase process waste stream 238 may then be optionally discharged to breathing spaces or to the atmosphere. Further, the vapor dominated multi-phase process waste stream 238 may be optionally passed to a combustion device 502, such as steam boilers, TOs, RTOs, RCOs, and TROs. It some embodiments, this combustion device may be an existing combustion device that is used to incinerate certain materials or to produce steam for general plant use. As noted, the reduction in the multi-phase loading to the combustion device 502 may provide for reduced corrosion or deterioration of the combustion device 502 itself due to the at least partial reduction in particular solids species that would otherwise add to such corrosion or deterioration. The exhaust gases 504 from the combustion device 502 are then discharged to breathing spaces or to the atmosphere. It should be appreciated that all of the condensate and rinsate streams 207, 217, 237 are sent to either product recovery or a waste water treatment process as shown.

Figure 6:
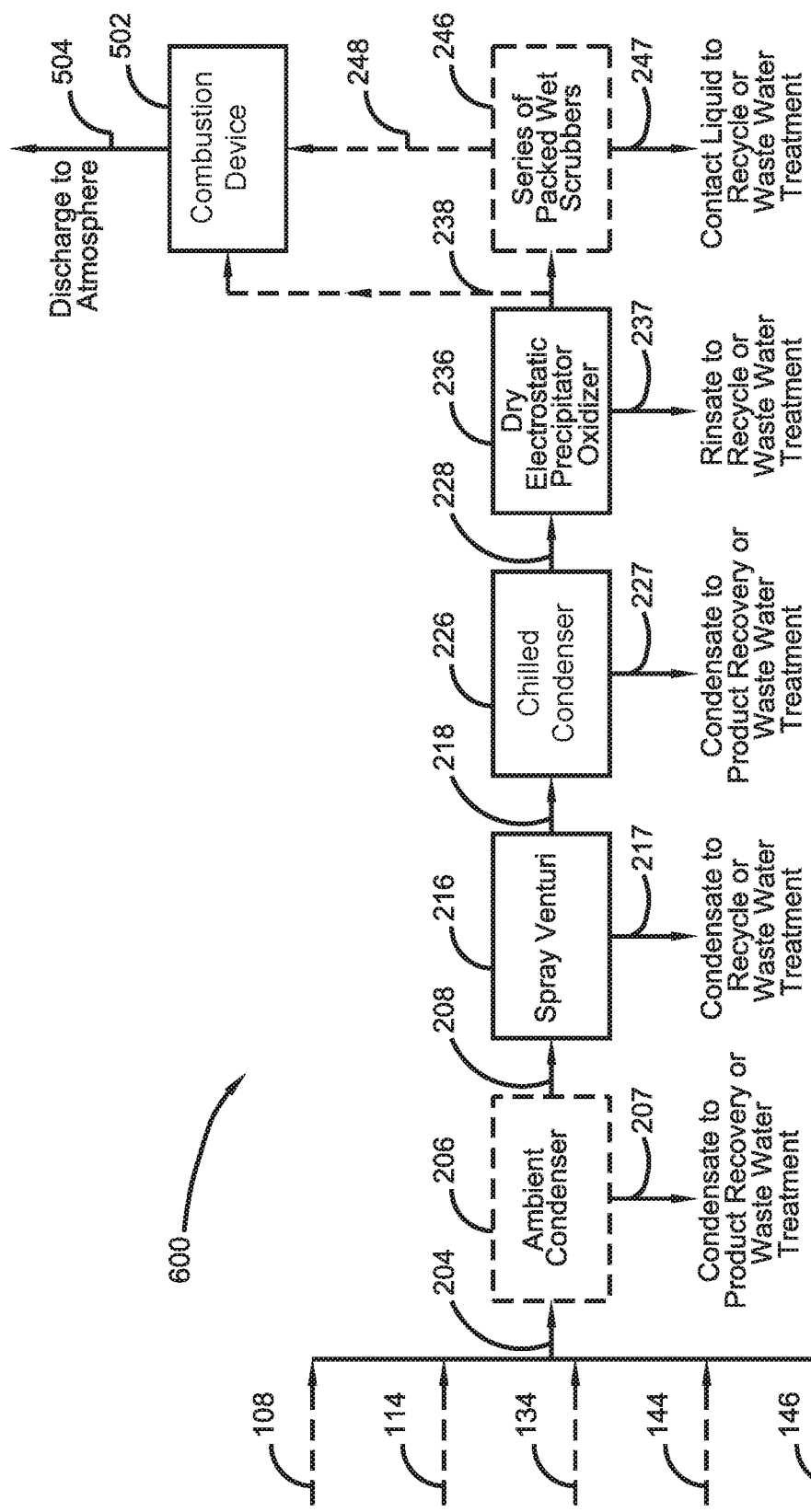
FIG. 6 illustrates a flow diagram of a process for treating one or more vapor dominated process waste discharges having commingled gas, liquid, and/or solid phases containing odorous, noxious, hazardous, toxic, mutagenic, and/or carcinogenic compounds and/or precursor compounds according to one embodiment of the present invention.

FIG. 6 illustrates a flow diagram of a process for treating one or more vapor dominated process waste discharges having commingled gas, liquid, and/or solid phases containing odorous, noxious, hazardous, toxic, mutagenic, and/or carcinogenic compounds and/or precursor compounds according to one embodiment of the present invention. The process 600 shown in FIG. 6 is similar to that shown in FIGS. 2 and 5 in that the initial streams that may be treated 108, 114, 134, 144, 146, 202, are the same and may be combined into a single stream 204 and optionally fed to an ambient temperature air or water condenser 206 where the vapor dominated multi-phase process waste stream is cooled to partially condense gases and to remove at least a portion of any entrained liquids and/or solids that comprise odorous, noxious, hazardous, toxic, mutagenic, and/or carcinogenic compounds and/or precursor compounds through, for example, agglomeration or combination of entrained liquids and solids together or onto newly condensed gases or vice versa. The ambient temperature condenser discharge 208 is fed into a gas/solid separator 216, such as a spray venturi, for separation of at least a portion of any entrained solid particles or particulate matter. The spray venturi vapor dominated multi-phase process waste streams 218 is passed to a chilled condenser 226, thereby further reducing the resulting vapor dominated multi-phase process waste stream (228) mass and volume of odorous, noxious, hazardous, toxic, mutagenic, and/or carcinogenic compounds and/or precursor compounds. The highly depleted, condensed and cooled multi-phase discharge 228 from the chilled condenser 226 then passes into the dry ESP oxidizer 236 to remove entrained solid and smoke particles, aerosolized oils fats greases, waxes and to oxidize odorous, noxious, hazardous, toxic, mutagenic, and/or carcinogenic compounds and/or precursor compounds. The dry ESP oxidizer vapor dominated multi-phase process waste stream, having a reduced concentration, mass and volume of odorous, noxious, hazardous, toxic, mutagenic, and/or carcinogenic compounds and/or precursor compounds 238 may optionally vent directly to the combustion device 502, thereby not using the optional (dashed) gas/liquid contactors 246. In some embodiments, the gas/liquid contactors (246) are required for optional treatment prior to discharge (248) to the combustion device 502. The exhaust gases 504 from the combustion device 502 are then discharged to breathing spaces or to the atmosphere.

In this embodiment, one or more of the vapor dominated multi-phase process waste streams 108, 114, 134, 144, 146, 202, or any other vapor dominated multi-phase process waste stream that is sent to a combustion device in a given process, may be treated as shown in FIG. 6. One or more of vapor dominated multi-phase process waste streams 108, 114, 134, 144, 146, 202, or any other vapor dominated multi-phase process waste stream, may optionally be combined into a single vapor dominated multi-phase process waste stream 204 that is fed to the ambient temperature condenser 206; to the gas/solid separator 216, such as a spray venturi; the chilled condenser 226; the particulate collection device 236, such as a dry ESP oxidizer; and the optional (dashed) gas/liquid contactors 246, such as a scrubbers, as described previously in connection with FIG. 2, FIG. 3, and FIG. 4. It should be appreciated that similarly all of the condensate and rinsate streams 207, 217, 227, 237, 247 are sent to either product recovery or a waste water treatment process or are recycled as shown.

In this embodiment, however, the vapor dominated multi-phase process waste stream is optionally discharged to the combustion device 502 after the dry ESP oxidizer 236 and/or the gas/liquid contactors 246 via discharge streams 238 and/or 248, respectively instead of to breathing spaces and/or the atmosphere, and the combustion device exhaust 504 is discharged to breathing spaces and/or the atmosphere. This embodiment is similar to that shown in FIG. 5 in that for processes that utilize a combustion device, or that for other reasons utilize a combustion device, can feed a highly treated vapor dominated multi-phase process waste stream that is significantly depleted in mass and volume and significantly cooled as a pre-treatment to the combustion device resulting in improved operation and reduced air pollution from a smaller, lower energy and carbon footprint combustion device.

In some embodiments, ammonia, and/or hydrogen sulfide contained in some vapor dominated multi-phase process waste streams that are treated according to the process illustrated in FIG. 6 can be more significantly reduced or removed in the ambient condenser 206, the spray venturi 216 and the chilled condenser 226 by adjusting pH levels at vapor dominated multi-phase process waste streams 204, 208, and 218. More specifically the hydrogen sulfide can be more effectively removed at a pH above 9.0 and ammonia can be more effectively removed at a pH of less than 5.0. In some embodiments, these waste streams may be further processed into marketable products (e.g. fertilizer, pet food supplementation) Further, the gas/liquid contactor 246 can be operated at a relative cool temperature, such as approximately 36° F., resulting in additional vapor dominated multi-phase process waste stream can be absorbed and condensed in the gas/liquid contactor 246, thereby reducing the mass and volume loading of the odorous, noxious, hazardous, toxic, mutagenic, and/or carcinogenic compounds and/or precursor compounds waste stream to the combustion device 502. The pre-treatment steps significantly reduces particulate matter (e.g. PM2.5 and PM10), reduces the corrosive and erosive capacity of the vapor dominated multi-phase process waste stream, reduces odorous, noxious, hazardous, toxic, mutagenic, and/or carcinogenic compounds and/or precursor compounds air pollution and ozone precursors (e.g. $NO_x$ and $SO_x$), and reduces the overall volume and mass of the vapor dominated multi-phase process waste stream. This will improve the combustion device 502 efficiency, reduce maintenance issues, and allow for a smaller size at reduced energy costs and resulting carbon footprint.

Figure 7:
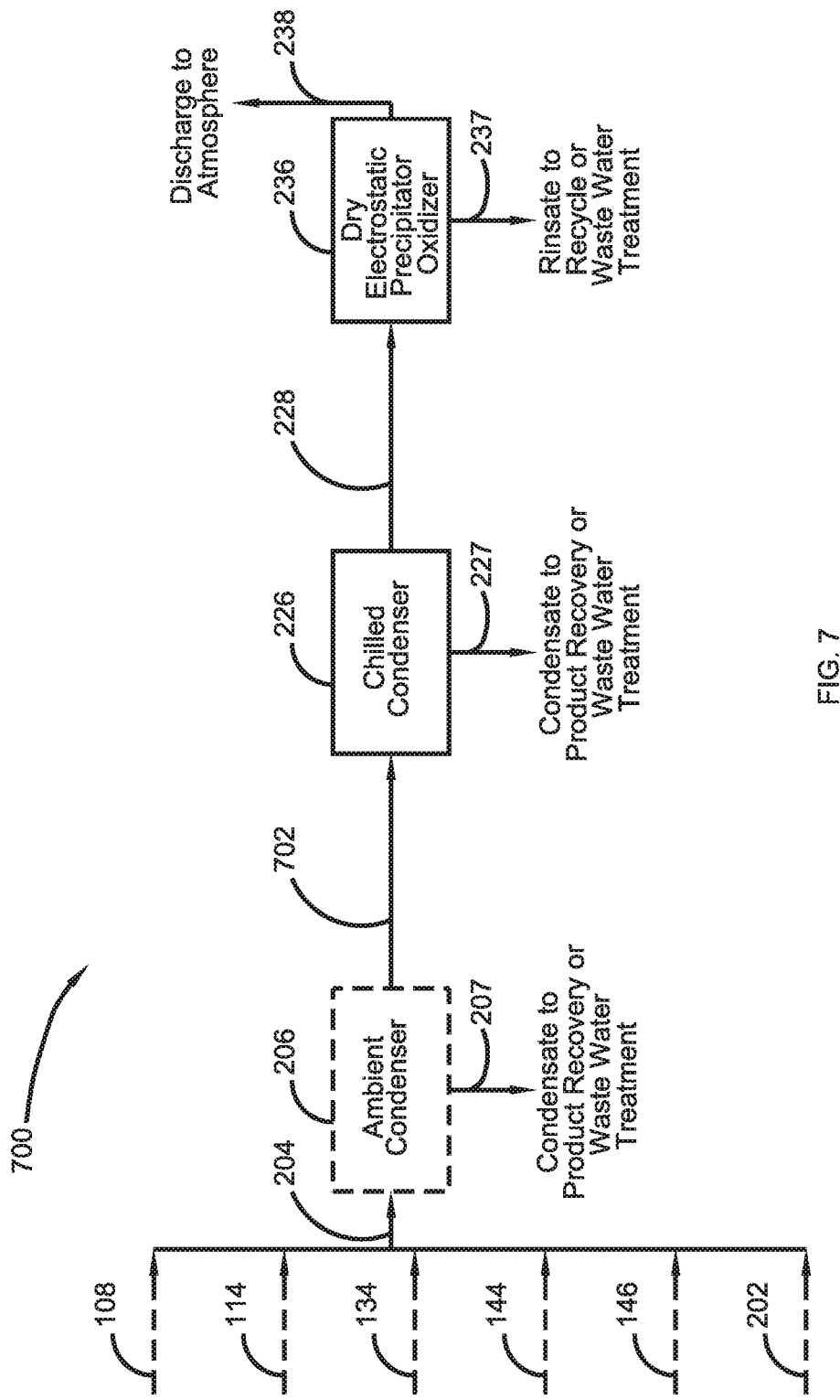
FIG. 7 illustrates a flow diagram of a process for treating one or more vapor dominated process waste discharges having commingled gas, liquid, and/or solid phases containing odorous, noxious, hazardous, toxic, mutagenic, and/or carcinogenic compounds and/or precursor compounds according to one embodiment of the present invention.

FIG. 7 illustrates a flow diagram of a process for treating one or more vapor dominated process waste discharges having commingled gas, liquid, and/or solid phases containing odorous, noxious, hazardous, toxic, mutagenic, and/or carcinogenic compounds and/or precursor compounds according to one embodiment of the present invention. The process 700 shown in FIG. 7 is similar to that shown in FIG. 2, and FIG. 6 in that the initial streams that may be treated 108, 114, 134, 144, 146, 202, are the same, as well as the use of the ambient temperature condenser 206, the chilled condenser 226, and the dry ESP oxidizer 236 prior to discharge to breathing spaces and/or the atmosphere.

One or more of vapor dominated multi-phase process waste streams 108, 114, 134, 144, 146, 202, or any other vapor dominated multi-phase process waste stream, may optionally be combined into a single vapor dominated multi-phase process waste stream 702 that is fed to the chilled condenser 226 and directly from the chilled condenser to the particulate collection device 236, such as an electrostatic precipitator, via a vapor dominated multi-phase process waste stream 704. Operation of the chilled condenser 226 and the particulate collection device 236 can be done as described previously in connection with FIG. 2 and FIG. 6. In this embodiment, the particulate loading or solid material in the vapor dominated multi-phase process waste streams that are treated is effectively reduced prior to discharge, which may be useful for those processes subject to stringent particulate matter emission regulations.

Figure 8:
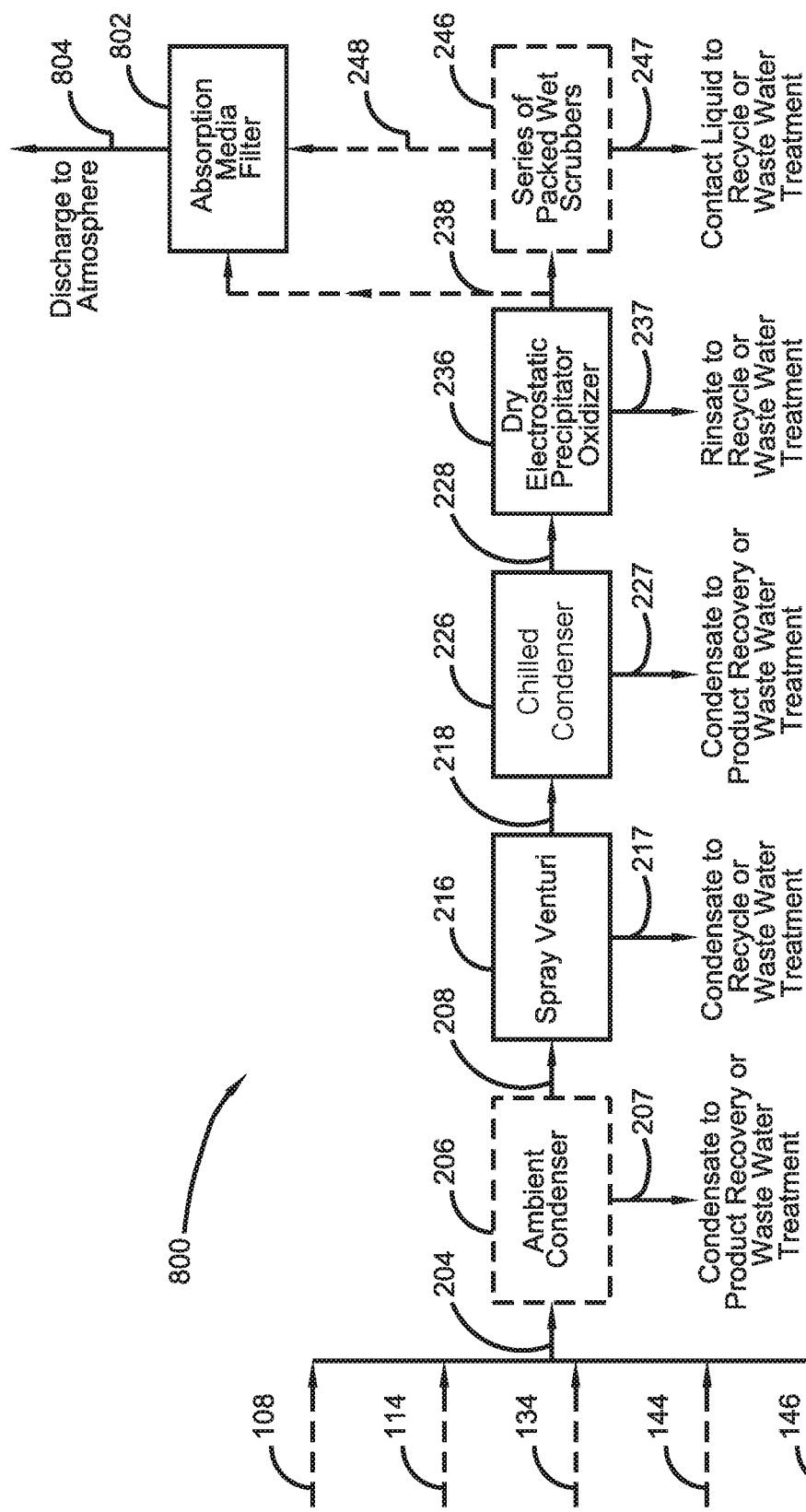
FIG. 8 illustrates a flow diagram of a process for treating one or more vapor dominated process waste discharges having commingled gas, liquid, and/or solid phases comprising odorous, noxious, hazardous, toxic, mutagenic, and/or carcinogenic compounds and/or precursor compounds according to one embodiment of the present invention.

FIG. 8 illustrates a flow diagram of a process for treating one or more vapor dominated process waste discharges having commingled gas, liquid, and/or solid phases comprising odorous, noxious, hazardous, toxic, mutagenic, and/or carcinogenic compounds and/or precursor compounds according to one embodiment of the present invention. The process 800 shown in FIG. 8 is similar to that shown in FIG. 2 and FIG. 6 in that the initial streams that may be treated 108, 114, 134, 144, 146, 202 are the same, as well as the use of the ambient temperature condenser 206, the spray venturi 216, the chilled condenser 226, and the dry ESP oxidizer 236 prior to optional discharge to an adsorption media filter (e.g. granular activated carbon, bio filter, etc.) 802 and/or optional discharge through the optional gas/liquid contactors 246 followed by discharge to the adsorption media filter 802.

Figure 9:
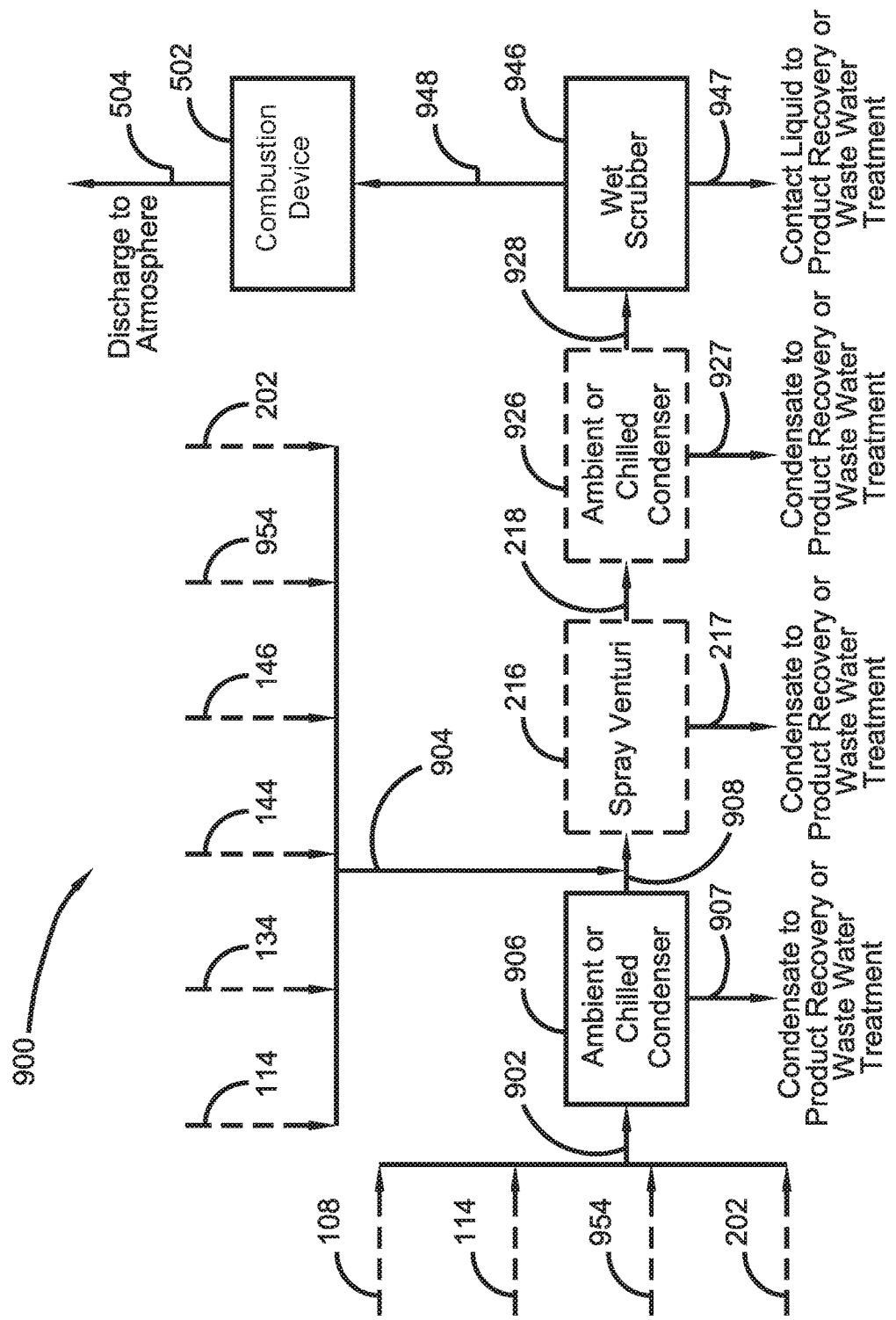
FIG. 9 illustrates a flow diagram of a process for treating one or more vapor dominated process waste discharges having commingled gas, liquid, and/or solid phases comprising odorous, noxious, hazardous, toxic, mutagenic, and/or carcinogenic compounds and/or precursor compounds prior to feeding the discharge stream to an oxidizer or combustion device, such as a thermal oxidizer, according to one embodiment of the present invention.

FIG. 9 illustrates a flow diagram of a process for treating one or more vapor dominated process waste discharges having commingled gas, liquid, and/or solid phases comprising odorous, noxious, hazardous, toxic, mutagenic, and/or carcinogenic compounds and/or precursor compounds prior to feeding the discharge stream to an oxidizer, such as a thermal oxidizer, according to one embodiment of the present invention. In this embodiment, one or more of the vapor dominated multi-phase process waste streams 108, 114, 134, 144, 146, 202, 218, 954 (evaporator system) or any other vapor dominated multi-phase process waste stream that is intended to be sent to an oxidizer or combustion device in a given process, may be treated or pre-treated to specifically prepare that waste stream for treatment in the combustion device.

In this embodiment, it should be appreciated that one or more of the vapor dominated multi-phase process waste streams 108, 114, 934, 202, or any other vapor dominated multi-phase process waste stream, may optionally be combined into a single vapor dominated multi-phase process waste stream 902 for treatment prior to feeding to a oxidizer or combustion device. The waste stream 902 is fed to an ambient temperature or chilled condenser 906 (which may in some embodiments be a tube and shell arrangement) where the temperature of the waste stream is reduced to condense certain species in the waste stream 902. The condenser discharge 908 is then optionally (represented by the dashed lines) fed to a gas/solid separator 216, such as a spray venturi. The condensate 907 from the condenser 906 is sent to product recovery or a waste water treatment process. It should be appreciated that one or more vapor dominated multi-phase process waste streams 114, 134, 144, 146, 954, 202, or any other vapor dominated multi-phase process waste stream, may be combined with the condenser discharge 908 or optionally combined into a single vapor dominated multi-phase process waste stream 904 that is combined with the condenser discharge 908 and then optionally fed to the gas/solid separator 216 where additional components in the stream 908 are removed. It should be appreciated that adding one or more vapor dominated multi-phase process waste streams 114, 134, 144, 146, 954, 202 to the condenser discharge 908 avoids adding any stream with a high particulate loading, such as a high oil loading or a loading of other species, that may otherwise interfere with operation of the condenser 906.

The gas/liquid separator discharge 218 is passed then optionally passed to a second ambient temperature or chilled condenser 926 where additional components in the stream 218 are removed. The discharge 928 from the second condenser 926 are then passed to a gas/liquid contactor, such as a wet scrubber or series of wet scrubbers, for further removal of certain species from the stream 928. It should be appreciated that each of the operations shown in FIG. 9, including the first condenser 906, the optional gas/solid separator or spray venture 216, the optional second condenser 926, and the wet scrubber or series of wet scrubbers 946 may be operated as described above in connection with FIGS. 2, 3, 4, and 4A. It should also be appreciated that all of the condensate and contact liquid streams 907, 217, 927, 947 are sent to either product recovery or a waste water treatment process as shown.

In this embodiment, the vapor dominated multi-phase process waste stream 948 discharged from the gas/liquid contactor or wet scrubber 946 is passed to a combustion device 502, and the combustion device exhaust 504 is discharged to the atmosphere. This embodiment is similar to that shown in FIG. 6 in that for processes that utilize a combustion device, or that for other reasons utilize a combustion device, can feed a highly treated vapor dominated multi-phase process waste stream that is significantly depleted in mass and volume and significantly cooled as a pre-treatment to the combustion device resulting in improved operation and reduced air pollution from a smaller, optionally catalytic, lower energy and carbon footprint combustion device. For those skilled in the art, wet scrubbing of a vapor waste stream is not typically performed before feeding to a combustion device because adding water vapor reduces combustion efficiency. In the specific case of rendering, for example, the vapor dominated waste stream consists of multiple phases, including high humidity; aerosolized water; aerosolized oils, fats, greases, tallow, waxes, etc.; solid and smoke particulates; all at a temperature above ambient. By passing such a multi-phase vapor dominated waste stream through a series of wet scrubbing devices, the total mass and moisture content is reduced, thereby increasing combustion efficiency and equipment longevity.

In operation of this and other embodiments, each treatment operation or system 906, 216, 926, and 946 incrementally and progressively removes, or reduces the concentration in the gas stream of, aerosolized oils, fats, greases, tallow, waxes, VOCs, SVOCs, ammonia, and/or hydrogen sulfide. At each treatment system 906, 216, 926, and 946, mass removal of aerosolized oils, fats, greases, tallow, waxes, VOCs, SVOCs, ammonia, and/or hydrogen sulfide may be enhanced by lowering temperatures to increase aerosol capture and increase gas-phase transfer into water phase by increasing the water solubility of gases.

In some embodiments, aerosolized oils, fats, greases, tallow, waxes, VOCs and SVOCs, ammonia, and/or hydrogen sulfide contained in some vapor dominated multi-phase process waste streams that are treated according to the process illustrated in FIG. 9 can be more significantly reduced or removed in the ambient temperature or chilled condenser 906, the optional gas/solid separator 216, the optional second ambient temperature or chilled condenser 926, and the gas/liquid contactor 946 by adjusting pH levels at vapor dominated multi-phase process waste streams 902, 904, 908, 218, and 928. More specifically the aerosolized oils, fats, greases, tallow, waxes can be more effectively removed by saponification at a pH above 9.0; hydrogen sulfide can be more effectively removed by increasing water solubility at a pH above 9.0; and ammonia can be more effectively removed by increasing water solubility at a pH of less than 5.0. In some embodiments, the condensates 907, 217, 927 and 947 streams may be further processed into marketable products (e.g. recoverable oils, fats, greases, tallow, wax; struvite, ammonium nitrate, and/or ammonium sulfate fertilizers; pet food supplementation, etc.). Further, the gas/liquid contactor 946 can be operated at a relative cool temperature, such as approximately 36° F., such that additional components in the vapor dominated multi-phase process waste stream can be absorbed and condensed in the gas/liquid contactor 946, thereby reducing the mass and volume loading of the odorous, noxious, hazardous, toxic, mutagenic, and/or carcinogenic compounds and/or precursor compounds waste stream to the combustion device 502.

As stated previously, particulate matter, especially PM2.5 and smaller, is increasingly recognized as the most significant global toxic air pollutant. The USEPA has just recently required PM2.5 stack testing after a process of determining the most effective methods for measuring condensable PM2.5 ($PM2.5_{cond}$). Since combustion is considered BACT for high intensity rendering vapor dominated multi-phase waste streams, air regulators have not required $PM2.5_{cond}$ or any other type of stack testing. However, due to the greater health risk associated with the smaller particles, which are capable of reaching into the lower regions of the respiratory system and where the nano-particle fraction of PM2.5 can pass into the blood stream and through the blood-brain barrier, stack testing of combustion devices and/or oxidizers will be standard requirements in the future. The pre-treatment steps 906, 216, 926, and 946 embodied in the present invention significantly reduce both particulate matter (e.g. PM2.5 and PM10) by condensation and wet scrubbing described above and reduce (by condensation and wet scrubbing described above) $PM2.5_{cond}$ precursors (such as aerosolized oils, fats, greases, tallow, waxes, VOCs, SVOCs, ammonia, and/or hydrogen sulfide, e.g. $2NH_3+H_2S+2O_2=(NH_4)_2SO_4$) that are created in the combustion/oxidation process. Because the pre-treatment steps 906, 216, 926, and 946 reduce the overall volume and mass of the aerosolized oils, fats, greases, tallow, waxes, VOCs, SVOCs, ammonia, and/or hydrogen sulfide contained in the vapor dominated multi-phase process waste stream via condensation and wet scrubbing, this significantly reduces the corrosive and erosive effects on the combustion device and/or oxidizer while at the same time reduces odorous, noxious, hazardous, toxic, mutagenic, and/or carcinogenic compounds and/or precursor compounds air pollution and ozone precursors (e.g. $NO_x$ and $SO_x$). By reducing the overall contaminant mass loading via condensation and wet scrubbing, the current invention in its various embodiments will improve the combustion device 502 efficiency, reduce maintenance issues, and allow for a smaller size at reduced energy costs and resulting carbon footprint.

Accordingly, it should be appreciated that in some embodiments, particulate matter being discharged by the system to the atmosphere may be reduced through the use of these pre-treatment steps, noting that any combination of these steps may be used, including the optional gas/solid separator 216 and the optional second condenser 926. In some embodiments, the ammonia and hydrogen sulfide act as precursors to the formation of ammonium sulfate, as described above, which is believed to add to the particular matter that is discharged from a given system. Therefore, it should be appreciated that reducing the concentration of either ammonia or hydrogen sulfide, or both, will result in a reduction of, for example, the formation of ammonium sulfate and a corresponding reduction in the particulate matter discharged.

In some embodiments, by increasing pH levels above 9.0, vapor dominated multi-phase process waste streams 902, 904, 908, 218, and 928 aerosolized oils, fats, greases, tallow, waxes, and hydrogen sulfide can be preferentially removed while allowing ammonia to remain in the vapor dominated multi-phase process waste stream. In this embodiment, the ammonia will not have the resulting sulfate anion to create the ammonium sulfate salt that constitutes a major contributor of $PM2.5_{cond}$ formation during combustion and/or oxidation of ammonia and hydrogen sulfide together. In addition, there is a net benefit to be realized with the remaining ammonia in the gas stream to reduce $NO_x$ discharge from the combustion device. Adding ammonia to gas streams fed into boilers is a common solution to $NO_x$ emissions to those familiar in the arts.

It should be reiterated that the pre-treatment steps may include the optional gas/solid separator 216 or the optional second condenser 926. Therefore, various combinations of steps may be used without or without these particular operations. For example, in some embodiments, one or more of the vapor dominated multi-phase process waste streams 108, 114, 934, 202, or any other vapor dominated multi-phase process waste stream, may be pre-treated by feeding to the first condenser 906, followed by the gas/solid separator or spray venture 216, and then followed by the gas/liquid contactor or wet scrubber (e.g., one or more wet scrubbers) 946. The resulting stream may then be passed directly to the oxidizer or combustion device 502. Again, it should be appreciated that various combinations of operations and equipment may be used.

Although the foregoing invention has been described in some detail to facilitate understanding, it will be apparent that certain alternatives, series ordering of treatment process steps, modifications, and equivalents may be practiced within the scope of the appended claims. Further, while developed for use in meat rendering plants, the invention and its various embodiments are designed to treat vapor dominated process waste discharges having commingled gas, liquid, and/or solid phases at a wide variety of industrial, commercial and environmental processes, including, but not limited to pet food manufacturing, food processing, food cooking, energy generation, indoor air pollution control, environmental remediation and mitigations, refining, petrochemical, chemical manufacturing, machining, printing, electronics, wood products, textiles, and pulp and paper. The invention has wide-ranging applications because of the commonality of industrial, commercial, and environmental process that results in the generation of vapors, solid particulates, smoke particulates, aerosols and water vapor constituting a comingled vapor dominated multi-phase process waste stream that contains odorous, noxious, hazardous, toxic, mutagenic, and/or carcinogenic compounds and/or precursor compounds that require removal or treatment prior to release to breathing spaces and/or the atmosphere. Accordingly, as noted previously, the embodiments described above are to be considered illustrative and not restrictive, and the invention is not to be limited to the details given herein but shall be determined by the scope and equivalents of the appended claims.

What is claimed is:

1. A method for reducing a concentration of one or more chemical compounds in a waste gas stream that are precursors to the formation of particulate matter emitted with the waste gas stream upon discharge to the atmosphere, comprising:
   passing a waste gas stream comprising a first chemical compound and a second chemical compound through a condenser, wherein the first chemical compound and the second chemical compound are precursors to the formation of a particulate and whose reaction forms the particulate;
   passing the gas stream from the condenser through a scrubber to remove at least one of the first chemical compound or the second chemical compound, thereby reducing the formation of the particulate otherwise caused by the reaction of the first chemical compound and the second chemical compound in the waste gas stream;
   passing the gas stream from the scrubber to a combustion device; and
   emitting the gas stream from the combustion device to the atmosphere.

2. The method of claim 1, wherein the first chemical compound comprises hydrogen sulfide.

3. The method of claim 2, wherein the second chemical compound comprises ammonia.

4. The method of claim 1, wherein the first chemical compound comprises ammonia.

5. The method of claim 1, wherein said passing the gas stream from the condenser through a scrubber comprises:
   passing the gas stream from the condenser to a first scrubber to remove the first chemical compound; and
   passing the gas stream from the first scrubber to a second scrubber to remove the second chemical compound.

6. The method of claim 5, wherein the first scrubber comprises contacting the gas stream with an alkaline scrubbing solution and the second scrubber comprises contacting the gas stream with an acidic scrubbing solution.

7. The method of claim 6, wherein the first chemical compound comprises hydrogen sulfide and the second chemical compound comprises ammonia.

8. The method of claim 5, wherein the first scrubber comprises contacting the gas stream with an acidic scrubbing solution and the second scrubber comprises contacting the gas stream with an alkaline scrubbing solution.

9. The method of claim 8, wherein the first chemical compound comprises ammonia and the second chemical compound comprises hydrogen sulfide.

10. The method of claim 1, wherein the combustion device comprises a thermal oxidizer.

11. A method for reducing a concentration of one or more chemical compounds in a waste gas stream that are precursors to the formation of particulate matter emitted with the waste gas stream upon discharge to the atmosphere, comprising:
    passing a waste gas stream comprising a first chemical compound and a second chemical compound through a condenser, wherein the first chemical compound and the second chemical compound are precursors to the formation of a particulate and whose reaction forms the particulate;
    passing the gas stream from the condenser through a gas/solids separator;
    passing the gas stream from the gas/solids separator through a scrubber to remove at least one of the first chemical compound or the second chemical compound, thereby precluding reaction of the first chemical compound and the second chemical compound in the gas stream;
    passing the gas stream from the scrubber to a combustion device; and
    emitting the gas stream from the combustion device to the atmosphere.

12. The method of claim 11, wherein the first chemical compound comprises hydrogen sulfide.

13. The method of claim 12, wherein the second chemical compound comprises ammonia.

14. The method of claim 11, wherein the first chemical compound comprises ammonia.

15. The method of claim 11, wherein said passing the gas stream from the condenser through a scrubber comprises:
    passing the gas stream from the condenser to a first scrubber to remove the first chemical compound; and
    passing the gas stream from the first scrubber to a second scrubber to remove the second chemical compound.

16. The method of claim 15, wherein the first scrubber comprises contacting the gas stream with an alkaline scrubbing solution and the second scrubber comprises contacting the gas stream with an acidic scrubbing solution.

17. The method of claim 16, wherein the first chemical compound comprises hydrogen sulfide and the second chemical compound comprises ammonia.

18. The method of claim 15, wherein the first scrubber comprises contacting the gas stream with an acidic scrubbing solution and the second scrubber comprises contacting the gas stream with an alkaline scrubbing solution.

19. The method of claim 18, wherein the first chemical compound comprises ammonia and the second chemical compound comprises hydrogen sulfide.

20. The method of claim 11, wherein the gas/solids separator comprises a spray venturi and the combustion device comprises a thermal oxidizer.

* * * * *